United States Patent
Su et al.

(10) Patent No.: US 6,945,099 B1
(45) Date of Patent: Sep. 20, 2005

(54) TORSIONAL RESONANCE MODE PROBE-BASED INSTRUMENT AND METHOD

(75) Inventors: Chanmin Su, Ventura, CA (US); Kenneth L. Babcock, Santa Barbara, CA (US); Lin Huang, Goleta, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 10/189,108

(22) Filed: Jul. 2, 2002

(51) Int. Cl.[7] .............................................. G01B 5/28
(52) U.S. Cl. .................................................... 73/105
(58) Field of Search .......................... 73/105, 579, 649, 73/650; 250/306, 307

(56) References Cited

U.S. PATENT DOCUMENTS

| | | | | |
|---|---|---|---|---|
| 5,267,471 A | * | 12/1993 | Abraham et al. | 73/105 |
| 5,347,854 A | * | 9/1994 | Martin et al. | 73/105 |
| 5,386,720 A | * | 2/1995 | Toda et al. | 73/105 |
| 5,503,010 A | * | 4/1996 | Yamanaka | 73/105 |
| 5,646,339 A | * | 7/1997 | Bayer et al. | 73/105 |
| 6,000,280 A | * | 12/1999 | Miller et al. | 73/105 |
| 6,006,593 A | * | 12/1999 | Yamanaka | 73/105 |
| 6,100,524 A | * | 8/2000 | Yagi et al. | 250/306 |
| 6,552,339 B1 | * | 4/2003 | Gupta et al. | 250/310 |
| 6,590,208 B2 | * | 7/2003 | Massie | 250/306 |
| 6,694,817 B2 | * | 2/2004 | Degertekin et al. | 73/661 |
| 2002/0121131 A1 | * | 9/2002 | Mancevski et al. | |

* cited by examiner

*Primary Examiner*—Helen Kwok
(74) *Attorney, Agent, or Firm*—Boyle Fredrickson Newholm Stein & Gratz S.C.

(57) ABSTRACT

An apparatus and method of operating a probe-based instrument in a torsional mode. The method includes providing a probe having a cantilever defining a longitudinal axis and supporting a tip. In operation, the method torsionally oscillates the probe generally about the longitudinal axis at a resonance. In addition, the method changes a separation distance between the tip and a surface of a sample so the tip interacts with the surface during data acquisition. By detecting a change in the torsional oscillation of the cantilever in response to the interaction between the tip and the surface, forces, including shear forces and shear force gradients, between the tip and the surface can be measured to determine sub-nanometer features.

65 Claims, 16 Drawing Sheets

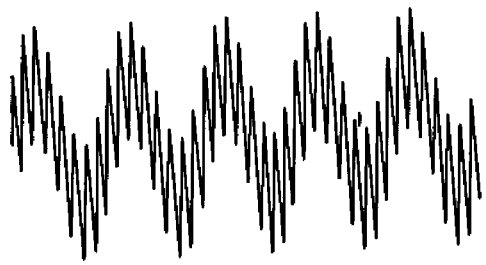
FIG. 14A
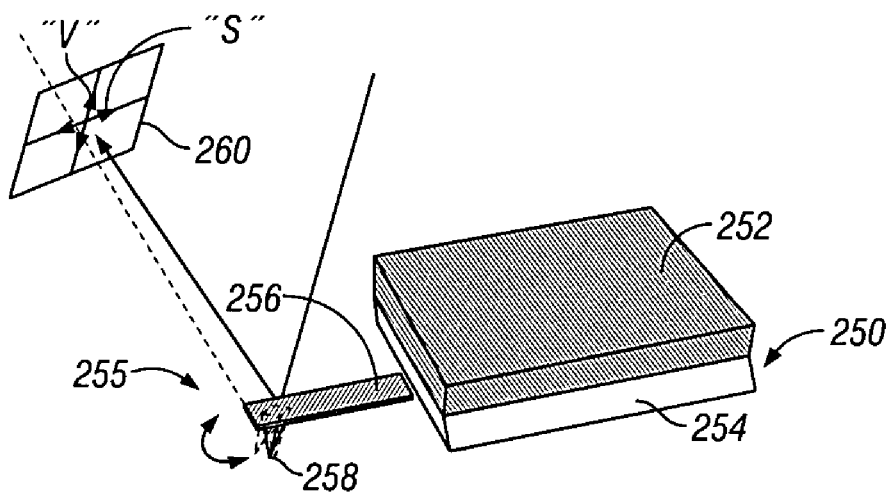
FIG. 14B
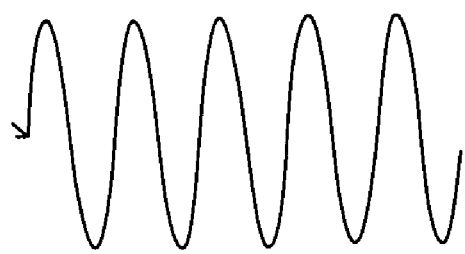 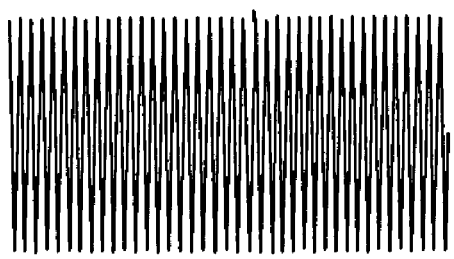
FIG. 14C  FIG. 14D

TORSIONAL RESONANCE MODE PROBE-BASED INSTRUMENT AND METHOD

BACKGROUND OF THE INVENTION

1. Field of the Invention

The present invention is directed to probe-based instruments, and more particularly, a scanning probe microscope that is operable in a torsional mode by driving the probe into torsional resonance about its longitudinal axis.

2. Description of Related Art

Several probe-based instruments monitor the interaction between a cantilever-based probe and a sample to obtain information concerning one or more characteristics of the sample. Scanning probe microscopes (SPMs), such as the atomic force microscope (AFM), are devices which typically use a sharp tip and low forces to characterize the surface of a sample down to atomic dimensions. More particularly, SPMs typically characterize the surfaces of such small-scale sample features by monitoring the interaction between the sample and the tip of the associated probe assembly. By providing relative scanning movement between the tip and the sample, surface characteristic data and other sample-dependent data can be acquired over a particular region of the sample, and a corresponding map of the sample can be generated. Note that "SPM" and the acronyms for the specific types of SPMs, may be used herein to refer to either the microscope apparatus, or the associated technique, e.g., "scanning probe microscopy."

The atomic force microscope is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc.

Preferably, the probe is scanned over a surface using a high-resolution three axis scanner acting on the sample support and/or the probe. The instrument is thus capable of creating relative motion between the probe and the sample while measuring the topography or some other property of the sample as described, for example, in Hansma et al. U.S. Pat. No. RE 34,489; Elings et al. U.S. Pat. No. 5,226,801; and Elings et al. U.S. Pat. No. 5,412,980.

AFMs may be designed to operate in a variety of modes, including contact mode and oscillating flexural mode. In contact mode operation, the microscope typically scans the tip across the surface of the sample while keeping the force of the tip on the surface of the sample generally constant by maintaining constant deflection of the cantilever. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation "flexural mode" of operation in which the cantilever oscillates generally about a fixed end. One popular flexure mode of operation is the so-called TappingMode™ AFM operation (TappingMode™ is a trademark of the present assignee). In a TappingMode™ AFM, the tip is oscillated flexurally at or near a resonant frequency of the cantilever of the probe. When the tip is in intermittent or proximate contact with surfaces the oscillation amplitude will be determined by tip/surface interactions. The amplitude or phase of this oscillation is kept constant during scanning using feedback signals, which are generated in response to tip-sample interaction. As in contact mode, these feedback signals are then collected, stored, and used as data to characterize the sample.

Independent of their mode of operation, AFMs can obtain resolution down to the atomic level on a wide variety of insulating or conductive surfaces in air, liquid or vacuum by using piezoelectric scanners, optical lever deflection detectors, and very small cantilevers typically fabricated using photolithographic techniques. Because of their resolution and versatility, AFMs are important measurement devices in many diverse fields ranging from semiconductor manufacturing to biological research.

One limiting characteristic of AFMs and other probe-based instruments lies in the above-described modes of operation. In an AFM, the cantilever is typically oscillated using a piezoelectric drive, often known simply as a piezo drive, to provide, for example, a flexural oscillation mode. Referring to FIG. 1, a probe assembly 20 includes a probe 21 having a cantilever 22 and a tip 28. The cantilever 22 extends outwardly from a base 24 of assembly 20. The cantilever 22 may be attached to the base 24 or formed integrally with it. Base 24 is typically coupled to a piezoelectric drive 26 (e.g., a piezo stack). Tip 28 is provided on the opposed, free end of cantilever 22. Piezoelectric drive 26 can be selectively excited by a signal generator 30 to move cantilever 22 up and down relative to a sample 32. When the instrument is configured for flexural oscillation mode operation, the drive voltage is applied to piezoelectric drive 26 to flexurally oscillate the cantilever 22 about a lateral axis of the probe 20 at a frequency that is dependent upon the frequency of the drive voltage.

More particularly, in flexural oscillation mode, cantilever 22 is driven to resonate at its flexural resonance frequency or a harmonic thereof about a lateral axis A–A' at the base 24 of cantilever 22. Characteristics of cantilever flexural oscillation, and changes thereof, are detected by quadrature photodetector 34, typically with its vertical components, as shown by the arrow "V" in FIG. 1. The deflection angle is sensed by photodetector 34 and output as a voltage signal. Notably, the amplitude of the flexural oscillation ranges between a few nm to 100 nm peak-to-peak depending on the cantilever length.

In operation, as tip 28 approaches a surface of sample 32, the flexural oscillation (tapping) amplitude starts to decrease due to contact between tip 28 and sample 32. Notably, the flexural vibration amplitude decreases to zero when tip 28 is pushed against sample 32 with constant contact pressure. Variation of amplitude between zero (generally continuous contact) and free oscillation is typically used in a feedback configuration to control tip/surface distance. Alternatively, the phase of the flexural oscillation may be used to control this distance. Information relating to the surface such as topology, hardness, and/or electromagnetic properties is then determined by analyzing the signals that are used to control this tip/surface spacing.

Overall, flexural oscillation mode AFMs are used to characterize surface topology and surface energy dissipation by monitoring the amplitude and/or phase of the oscillating cantilever. This mode is often preferred to contact mode imaging because it produces less damage to the tip and sample during operation. However, operating the AFM based on flexural oscillation of the cantilever is constrained in the following aspects.

Initially, flexural mode operation only detects surface characteristics that impart a force in one direction, namely, the vertical or "Z" direction. As a result, flexural mode AFMs do not detect shear force interaction, and thus also cannot provide shear force or force gradient information. This information is critical to making measurements of surface friction, for example, when attempting to identify surface compositional differences. When the topography of the materials is generally undifferentiated, minimal information is provided by flexural mode operation, and thus this friction information becomes particularly valuable, and sometimes necessary. Applications include identifying different components in polymer blends, composites and other mixtures, identifying organic and other contaminants on sample surfaces, delineating coverage by deposited coatings and other surface layers, etc.

Moreover, without shear force or shear force gradient measurement capabilities, flexural mode operation often results in loss of other information relating to the sample. For example, when a flexural oscillation mode AFM is used to image the magnetic domain of a sample, only a force gradient in the direction perpendicular to the sample surface can be sensed. Domains parallel to the surface can only be seen at the domain boundaries where the transitional region has a vertical force gradient. This limitation also holds true for electric force imaging.

Other drawbacks associated with flexural resonance imaging are slow kinetics and small amplitude errors that can drastically limit scanning and data acquisition speed and compromise image integrity. This effect is illustrated in the response curve 40 of FIG. 2. In this case, $A_O$ is the free air amplitude of oscillation (in RMS voltage), and $A_S$ is the set-point amplitude. When tip/sample separation is reduced, and the tip and sample interact, there is a corresponding change in the signal produced by the deflection detection system. The amplitude of flexural oscillation of the lever decreases due to it being constrained by the sample surface as the tip approaches the surface and taps the sample in each stroke of the oscillation. This is shown in region "O" in which tip-surface distance (x-axis) is smaller than half of the peak-to-peak oscillation of the cantilever. Notably, a feedback loop operates to move the cantilever up and down to keep generally the same oscillation amplitude $A_S$. This movement reflects height changes in the sample, i.e., surface topography.

The response of the cantilever in this flexural mode is illustrated by the slope of the curve at region "O." In other words, for a particular change in tip/sample separation, the corresponding measured change in voltage is relatively small. It is this measured change that determines the error that is processed by the feedback loop to return operation to the set-point oscillation. Because the slope of the cantilever response in flexural mode is relatively shallow, scan speed must be kept small as relatively large changes in tip-sample separation produce a relatively small change in measured output, or error. Therefore, to facilitate adequate data collection and integration of error signals, the scan time at each location (or image pixel) must be long enough for the system to respond with accuracy and resolution. The speed of data acquisition must be correspondingly limited as well. An improvement in data acquisition speed was desired.

Moreover, the shallow slope of the amplitude/distance curve in FIG. 2 makes the control signal (voltage in the vertical axis) correspond to a large height or distance compared to an amplitude/distance curve with a steeper slope. As a result, the control error will correspond to a greater quantity of height measurement error. The situation is particularly problematic when the probe is scanning across an abrupt step where slower response due to error integration will result in even greater inaccuracy for a given scan speed. Notably, such inaccuracy may be detrimental to obtaining useful data in semiconductor metrology.

Yet another limitation with flexural mode operation is that the flexural resonance is very sensitive to the imaging environment (e.g., when the sample is immersed in water), and thus oscillation properties often change drastically, and in unpredictable ways, upon change in imaging environment. Currently, the sensitivity of flexural mode operation to imaging environment is one of the most significant design considerations when configuring an AFM for operation in fluid.

Other modes of AFM operation are similarly limited. For example, shear force interaction between the probe in contact mode and the corresponding sample surface has been studied with AFM for a number of years. In an AFM technique known as lateral force microscopy (LFM), the cantilever tip is dragged across the sample surface, as in contact mode, to measure friction forces, as described in U.S. Pat. No. 5,553,487 to the present assignee. More particularly, using LFM, the tip is introduced to the sample surface under a constant deflection and then scanned along the surface either in the direction of the cantilever length, or perpendicular to the cantilever length. Using a laser-based deflection detection system, the lateral cells of the corresponding photodetector sense rotation of the cantilever as the tip of the probe interacts with the sample through friction force. In the case where tip scanning direction is perpendicular to the cantilever, the difference of the lateral deflection during forward and reverse scanning of the same portion of the sample is used as a relative measure of the shear force, or surface friction. In addition to the drawbacks associated with using contact mode to detect topology characteristics, including tip/sample damage, etc., LFM suffers the disadvantage of poor lateral resolution and poor repeatability.

In other techniques, the tip placed in contact with the sample surface is modulated by moving the sample surface laterally relative to the probe. In this case, the lateral rocking of the cantilever as a result of the contact friction is used to indicate a quantity of surface friction. However, the lateral deflection signals are small, and thus often unusable, and resolution is insufficient for some of the applications contemplated by the present invention.

In addition, although lateral deflection signals induced by motion of the sample at acoustic frequencies can be enhanced, the main control loop that defines tip/surface relative position still employs vertical deflection (contact mode) feedback and, therefore, suffers the drawbacks associated with that technique, including slow kinetics, and inability to image a shear force gradient.

As a result, the metrology and other research fields were in need of a probe-based instrument capable of detecting multi-directional forces with improved imaging speed. More particularly, an AFM capable of imaging shear forces and shear force gradients with components exhibiting fast response dynamics was desired.

SUMMARY OF THE INVENTION

The preferred embodiment overcomes the drawbacks of prior art systems by providing a probe-based instrument, such as an AFM, operable in a torsional resonance mode, or simply "torsional mode." In torsional mode, the AFM oscillates the probe at a torsional resonance to allow detection of the effects of probe-sample interaction. For instance, torsional mode oscillation allows the detection of shear forces (e.g., friction) and shear force gradients, as well as more conventional forces, at increased imaging speed. Notably, the present design achieves improved AFM imaging due at least in part to the fast response dynamics associated with the torsional resonance of the probe, as well as its ability to image multi-directional forces.

According to a first aspect of the preferred embodiment, a method of operating a probe-based instrument includes providing a probe including a cantilever and, including a tip. In operation, at least the tip of the probe is torsionally oscillated generally about a longitudinal axis of the probe at a resonance of the probe.

According to another aspect of the preferred embodiment, the method further includes changing a separation distance between the tip and a surface of a sample so that the tip interacts with the sample. In response, the method detects changes of the torsional oscillation amplitude and/or frequency as the separation between the tip and the surface is altered. Notably, this change may be indicative of a shear force between the tip and the sample, or other interactions with lateral components.

In another aspect of this embodiment, the method includes the step of measuring a phase difference between a drive signal used to torsionally oscillate the cantilever and an oscillation of the cantilever in response to an interaction between the tip and the sample.

According to a still further aspect of the preferred embodiment, the method may include scanning a sample with the tip wherein the scanning step is performed at a rate between, for example, 2 lines per second (1 hz, low rate) and 40 lines per second (20 hz, high rate).

According to an alternate aspect of the preferred embodiment, the method includes a detecting step for sensing a force gradient through shift of the cantilever torsional resonance frequency caused by tip-sample interaction.

In another aspect of the preferred embodiment, the method further includes flexurally and torsionally oscillating at least the tip of the probe at a flexural and torsional resonance of the probe. In this case, torsional resonance mode and flexural oscillation mode may be preformed simultaneously or sequentially.

According to another aspect of this preferred embodiment, the method further includes detecting torsional and flexural oscillation of the tip. In addition, the method includes the steps of generating a drive signal (to be applied to, for example, piezo drive 26 in FIG. 1) which contains components for driving the probe at torsional and flexural resonance. The detected signal in this case is then decomposed into a vertical signal and a lateral signal corresponding to the flexural and torsional responses, respectively.

In a further aspect of the preferred embodiment, the method further includes the step of using an asymmetric transducer. The transducer preferably includes first and second piezoelectric elements coupled to the probe assembly. First and second drive second piezoelectric elements coupled to the probe assembly. First and second drive signals are transmitted to the first and second piezoelectric elements to drive the probe into torsional resonance. This asymmetric drive is achieved because the first and second drive signals are about 180 degrees out of phase.

According to another aspect of the preferred embodiment, the driving step includes applying an oscillating signal to an actuator that is coupled to the probe, the probe having first and second arms that oscillate flexurally out of phase, yielding torsional motion at the tip.

According to a further aspect of the preferred embodiment, a method of measuring a property of a sample includes driving a probe having a tip at about a torsional resonance of the probe and changing a separation between the tip and the sample so as to cause interaction between the tip and the sample. The tip/sample interaction is then detected by monitoring torsional oscillation of the probe.

In another aspect of the preferred embodiment, a probe-based instrument includes a probe assembly that has a base and a probe. The probe includes a cantilever extending from the base and a tip supported by the cantilever. A acoustic drive is coupled to the probe assembly to actuate the probe into torsional oscillation.

In a further aspect of this embodiment, the drive is asymmetric and includes at least two sources of ultrasonic energy that direct corresponding ultrasonic pressure beams toward the cantilever. When the beams are out of phase, a torsional oscillation of the probe is generated.

In another aspect of the preferred embodiment, the drive is asymmetric and the cantilever of the probe assembly is magnetized. In addition, the drive is a magnetic field source that generates a magnetic torque in the probe to cause rotation of the tip about the longitudinal axis of the cantilever.

In another aspect of the preferred embodiment, the cantilever is applied with a DC or AC voltage. In addition, the drive is an electric field source that generates an electric static force to the cantilever to cause the rotation of the tip about the longitudinal axis of the cantilever.

According to another aspect of the preferred embodiment, the drive produces a modulated signal that actuates the cantilever into flexural oscillation as well as torsional oscillation. In addition, the instrument includes a detector to sense a change in at least one of the torsional oscillation and the flexural oscillation of the cantilever.

In another aspect of the preferred embodiment, a drive for a probe-based instrument includes an actuator coupled to a probe assembly of the instrument. The probe assembly includes a probe having a tip. In operation, the actuator drives the probe to oscillate at a torsional resonance thereof.

In yet another aspect of the preferred embodiment, a method of operating a probe-based instrument includes applying a signal to an actuator to drive at least the tip of a probe of the instrument into torsional oscillation. The method also operates another positioning device to position the tip relative to a sample so as to cause interaction between the tip and the sample at a generally constant separation. In addition, the method detects a characteristic of the torsional oscillation to determine a surface characteristic of the sample under study. To generate the corresponding data, the method maintains a characteristic of the torsional oscillation at a set-point, i.e., previously mentioned constant, using feedback.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 14A is a plot of the input signal to the piezo plate of FIG. 11;

FIG. 14B is a schematic view of a drive and a probe assembly of an SPM configured for torsional resonance mode operation;

FIGS. 14C and 14D illustrate a vertical output signal and a lateral output signal, respectively, when driving the probe assembly of FIG. 14B with the input signal of FIG. 14A;

DETAILED DESCRIPTION OF THE PREFERRED EMBODIMENT

A probe-based instrument, such as an AFM, that analyzes one or more characteristics of a sample in a torsional resonance mode is shown in the Figures and described herein. More particularly, any one of a number of techniques for generating a steady torsional resonance in the cantilever of the SPM probe assembly is employed, together with feedback control, to image or otherwise characterize sample surfaces.

During operation, a property of a torsional oscillation of the probe (e.g., amplitude or phase of probe oscillation about the longitudinal centerline of the probe's cantilever) is monitored to determine sample surface characteristics. Notably, the torsional signal detection and feedback control is preferably implemented using configurations similar to that used in known AFMs, such as in the AFMs offered by the present assignee. However, compared to known AFM operating modes, including flexural oscillation mode operation, the potential benefits of the present torsional resonance mode of AFM operation include improved scanning speed, as well as offering the ability to provide dynamic friction force measurements and force gradient measurements in multiple directions. Moreover, these benefits can be achieved while simultaneously operating the AFM in conventional flexural mode.

Torsional Resonance Mode

Figure 1:
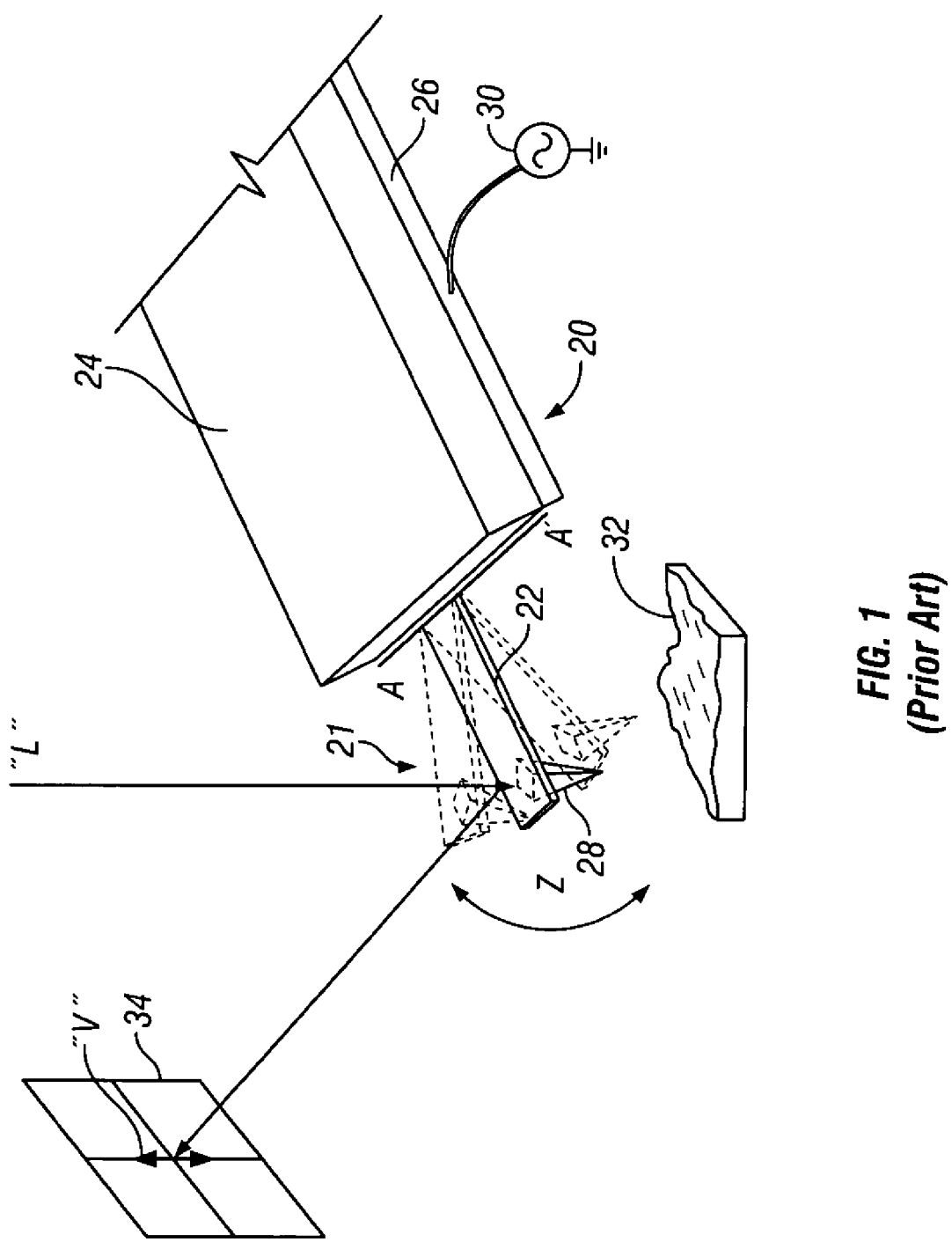
FIG. 1 is a schematic view of a prior art scanning probe microscope configured for flexural mode operation, appropriately labeled "Prior Art"
Figure 2:
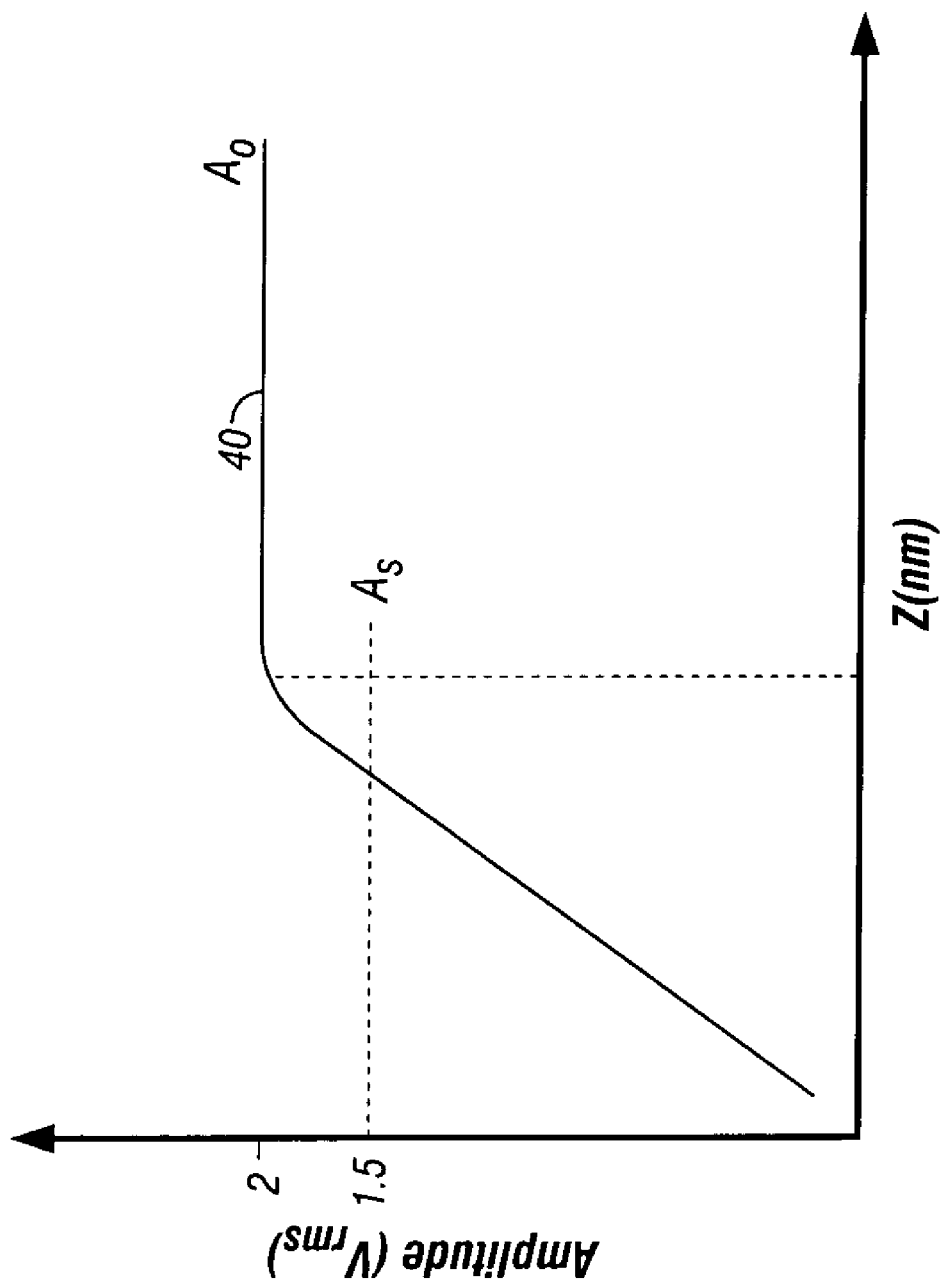
FIG. 2 is a force curve illustrating the response of the flexural mode AFM shown in FIG. 1.
Figure 3:
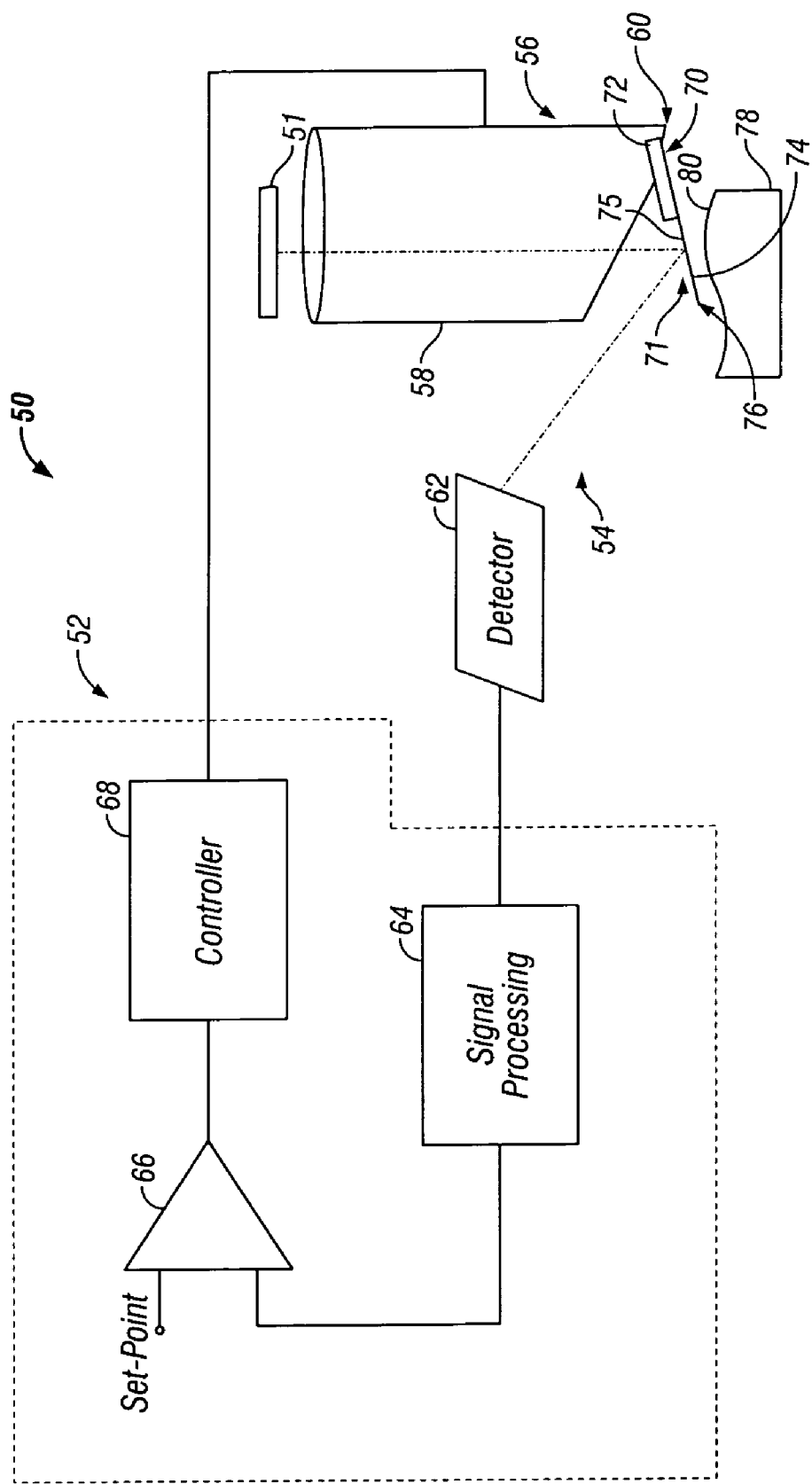
FIG. 3 is a schematic view of a torsional resonance mode scanning probe microscope of a preferred embodiment of the invention.
Figure 9:
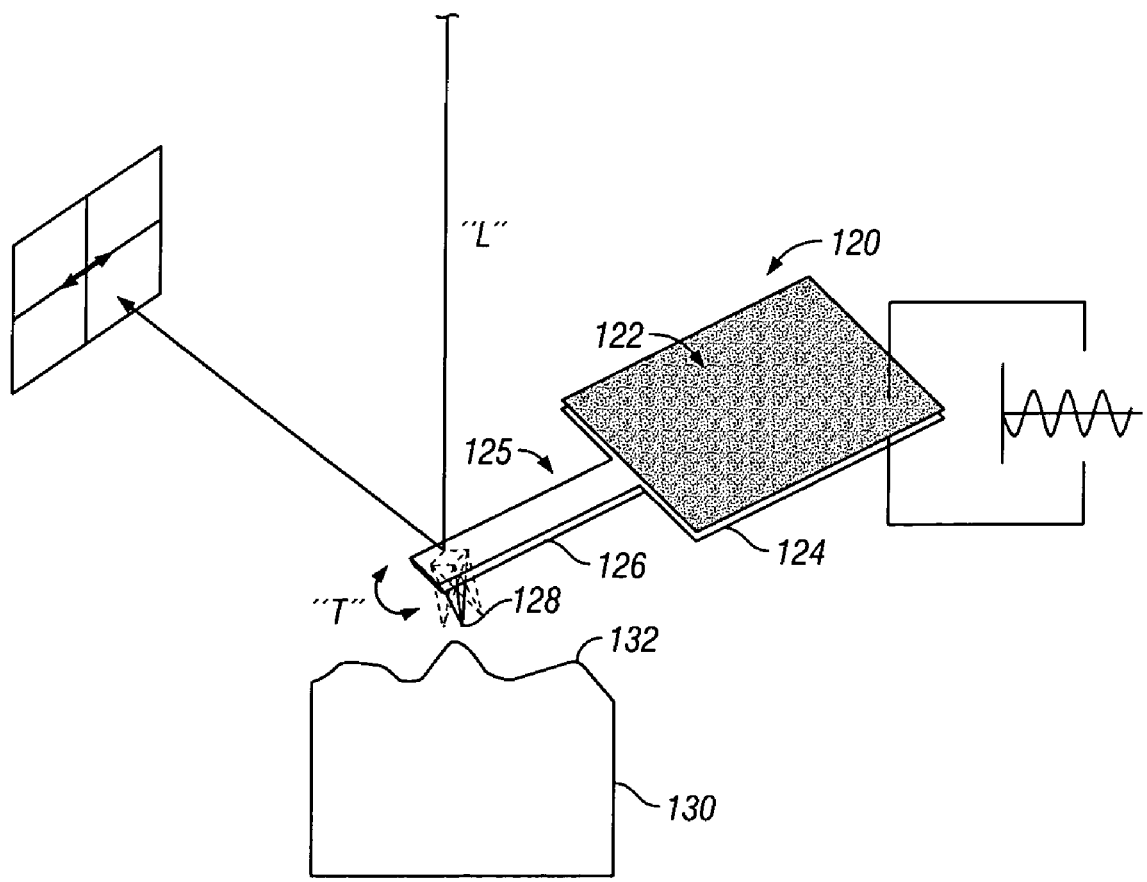
FIG. 9 is a schematic view of a drive for a torsional resonance mode SPM, according to an alternate embodiment.

A torsional resonance mode atomic force microscope 50 is shown in further detail in FIG. 3. AFM 50 includes a feedback control system 52, a probe oscillation deflection detection system 54, an actuator 56, and a probe assembly 70. Probe assembly 70 includes a base 72 and a probe 71. The probe includes a cantilever 74 extending from the base 72 and a tip 76 that interacts with a surface 80 of a sample 78 during operation. Notably, probe assembly 70 also includes an actuator that is used to drive the cantilever into oscillation. In the case of an active lever, a piezoelectric layer 122 operates as the actuator (FIG. 9). Alternatively, a piezo plate (FIG. 11) may be employed to drive the cantilever.

In this embodiment, probe assembly 70 is supported by actuator 56. Actuator 56 preferably defines an XYZ scanner 58 that may be implemented with, for example, a piezoelectric tube or piezoelectric stack that translates a free end 60, and thus probe assembly 70 coupled thereto, in three orthogonal directions. More particularly, the XY section of scanner 58 translates the probe along the sample surface 80, while the Z drive section of scanner 58 translates the probe assembly orthogonally to the sample surface, for example, in response to feedback from control system 52 during data acquisition.

To operate AFM 50 in torsional resonance mode, at least the tip 76, and preferably the entire cantilever motion of the probe 71 is initially driven into oscillation at or near a torsional resonance of probe 71 using any of the techniques described below. The separation between tip 76 and sample 78 is then reduced (e.g., by exciting actuator 58 in Z) to cause the two to interact. A beam of light "L" generated by probe oscillation detection system 54 (e.g., a laser 51), is directed towards a back 75 of cantilever 74 so that it is reflected therefrom. The reflected beam is then sensed by a detector 62. Preferably, detector 62 is a quadrature (i.e., four-cell) photodetector.

Notably, the interaction between tip 76 and sample 78 causes the reflected beam to translate laterally across detector 62. This lateral movement of the reflected light beam is indicative of one or more sample surface characteristics. More particularly, the oscillating motion of cantilever 74 is detected by the lateral cells of quadrature deflector 62 which produces a corresponding AC signal. Changes in this AC signal are indicative of surface and possibly other characteristics of the sample under study.

To quantify these characteristics, the AC signal output by detector 62 (i.e., lateral deflection signal) is transmitted to feedback control system 52, and in particular, a signal processing block 64. Signal processing block 64 outputs a signal associated with the lateral motion of the cantilever. Preferably, signal processing block 64 includes an RMS-to-DC converter that converts the AC signal output by photodetector 62 to a DC value, a value indicative of a surface characteristic of the sample. In this case, the lateral signal output by processing block 64 is then transmitted to a comparator circuit 66 that generates an error signal based on a predetermined set-point corresponding to the desired torsional oscillation. The desired torsional oscillation may be defined in terms of the oscillation amplitude. Alternatively, the phase of the signal output by detector 62 can be analyzed and compared with an appropriate set-point phase of torsional oscillation. In this way, the phase or frequency signal can be used as the error signal of the feedback loop to control probe-sample interactions. Rather than an RMS-to-DC converter, a lock-in amplifier or any other structure capable of performing the identified functions may be employed.

The error signal output by comparator 66 is then transmitted to a controller 68 that compensates for the error by generating a control signal that returns the torsional oscillation of the probe back to the set-point value. Controller 68 may be a proportional-integral (P-I) gain stage in the feedback loop that generates and transmits a correction signal to XYZ scanner 58. In response to the correction signal, scanner 58 translates probe assembly 70 orthogonally to the surface of sample 78 (i.e., in "Z") to return the oscillation of the probe 71 to the set-point value. Notably, it is typically the control signal output by controller 68 that provides the data pertaining to the sample surface.

In addition, when relative scanning movement between probe assembly 70 and sample 78 is employed, a map of sample surface 80 may be generated by plotting the correction signals generated by the controller 68 for each scan position. Again, the X-Y components of scanner 58 are used to position tip 76 at different locations of surface 80 of sample 78 to allow generation of the map. Alternatively, torsional mode can be employed to conduct a force measurement and generate a corresponding curve. In this measurement, the tip 76 interacts with the sample 78 at different "Z" positions, and the corresponding forces are measured. One notable experiment includes using the tip 76 to "pull" on a molecule on a surface of a sample. Such force measurements (e.g., measuring local stiffness) are described in U.S. Pat. No. 5,224,376, assigned to the present assignee, and expressly incorporated herein by reference.

Figure 4:
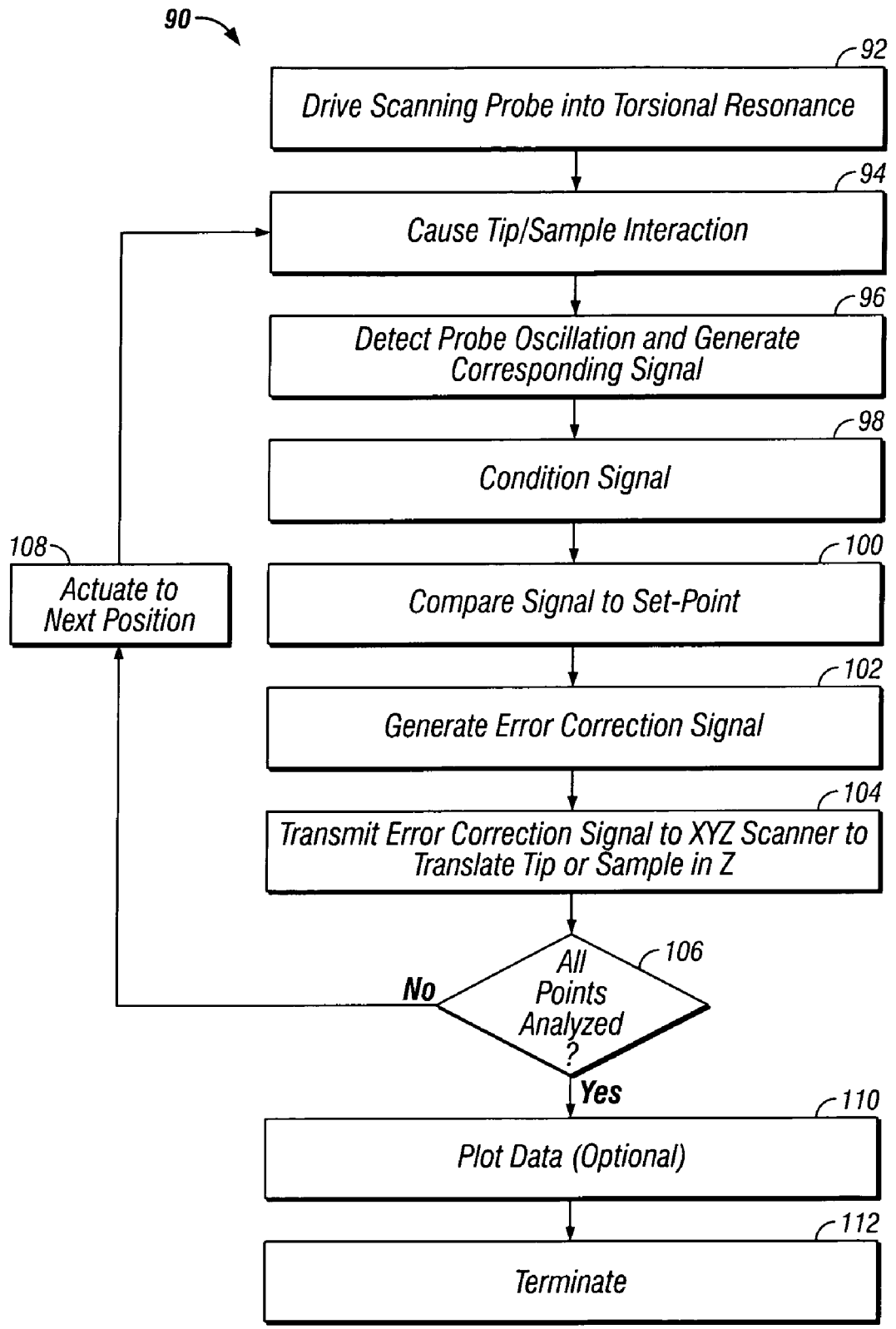
FIG. 4 is a flow chart illustrating a method of operating a scanning probe microscope in the torsional resonance mode of the embodiment of FIG. 3.

Turning to FIG. 4, a flow chart illustrates a method 90 of torsional mode operation using AFM 50. In Block 92, AFM 50 instigates torsional oscillation mode by appropriately driving an AFM probe 71 using any one of a number of techniques that develops torque about a central or other longitudinal axis of cantilever 74 of probe assembly 70. These techniques, and their associated apparatus, are described in further detail below.

Next, the separation distance between the tip 76 and the sample 78 is reduced so the two begin to interact. As a result of this interaction, the torsional motion of the probe 71 changes. These changes are sensed in Block 96 as the detection system (54 in FIG. 3) monitors the motion of the probe and generates corresponding output signals. Block 98 conditions the output from the detection system. For example, method 90 may employ an RMS-to-DC circuit that converts the AC output to a DC value. The conditioned output (e.g., from the signal processing circuit 64 in FIG. 3) is then compared, in Block 100, to the set-point associated with the desired oscillation of the probe. This comparison yields an error signal comprising the difference between the detected oscillation of the probe and the set-point. Once the comparison in Block 100 is complete and an error signal is generated, the error signal is transmitted to the compensator (68 in FIG. 3) where the method 90 generates an error correction or control signal in Block 102. Preferably, the control signal is generated using a P-I gain stage, as described previously.

In Block 104, the control signal is transmitted to the XYZ scanner 58 of FIG. 3 to translate the tip or sample in "Z" to return the oscillation of the probe to its set-point value. Again, the set-point may either be associated with an amplitude of the torsional resonance oscillation of the cantilever, a frequency of that oscillation, or a phase of that oscillation. Then, in Block 106, method 90 determines if additional points of the sample surface are to be considered. If so, a scanner positions the tip 76 of the probe 71 at the next point on the sample surface in Block 108, and repeats the data acquisition steps. Once all points have been considered, an image may be generated using the acquired data in optional Block 110, and the method 90 terminates in Block 112.

Figure 5:
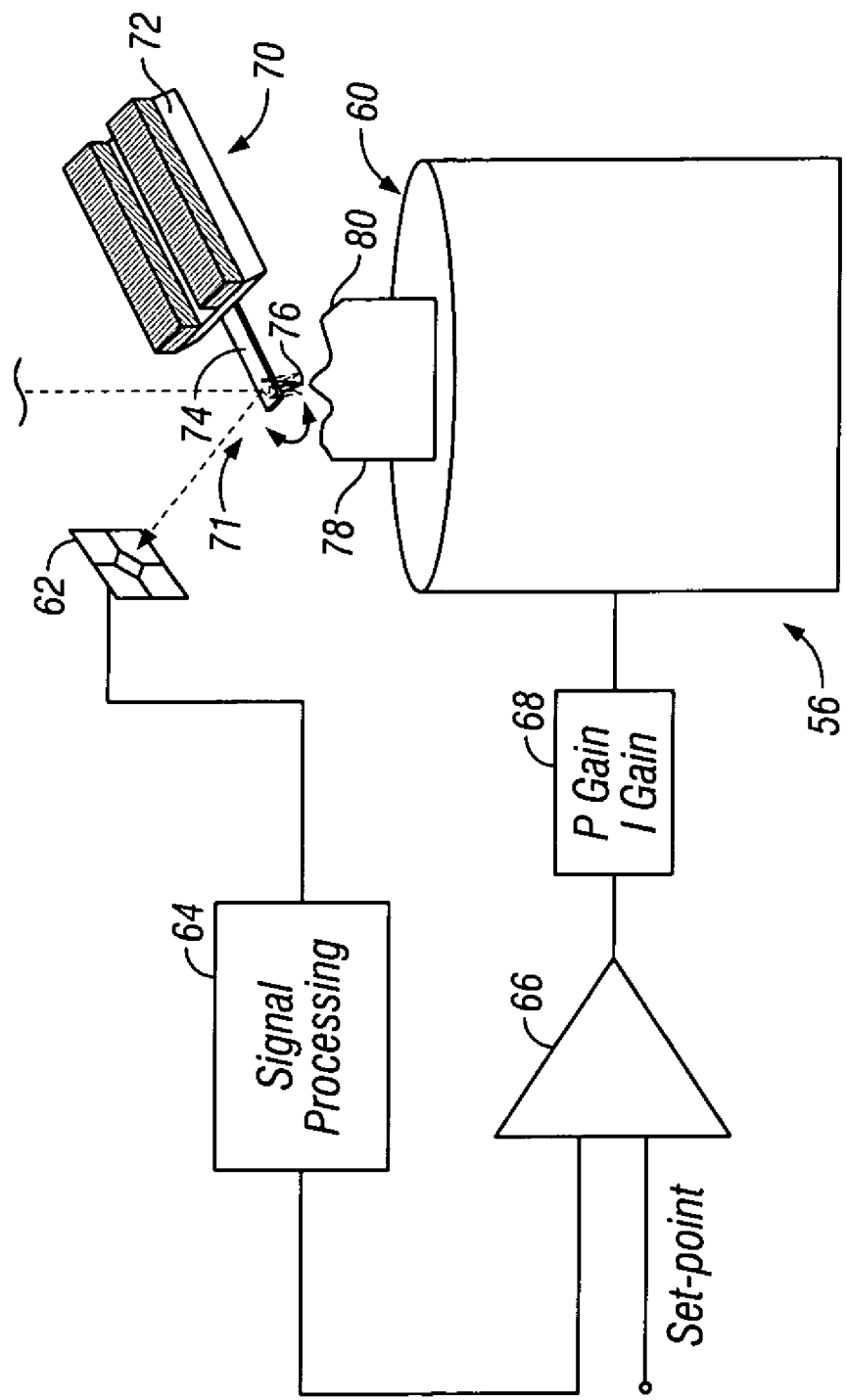
FIG. 5 is a schematic view of a torsional resonance mode scanning probe microscope similar to the microscope of FIG. 3, configured for scanned sample operation.

Turning next to FIG. 5, in an alternative arrangement, sample 78 is placed on a free end 60 of XYZ scanner 56 so that the relative position between sample 78 and probe assembly 70 can be modified by moving sample 78, rather than probe assembly 70. Such an arrangement is particularly useful in research applications, for example using the MultiMode™ AFM offered by the present assignee. In this case, detection system 62 senses changes in the torsional oscillation of cantilever 74, but rather than actuating the position of probe assembly 70 to maintain the set-point torsional oscillation, sample 78 is translated to maintain the set-point torsional oscillation. Of course, any combination of actuators may be implemented to provide relative movement between the sample and the probe assembly in three orthogonal directions.

Figure 6:
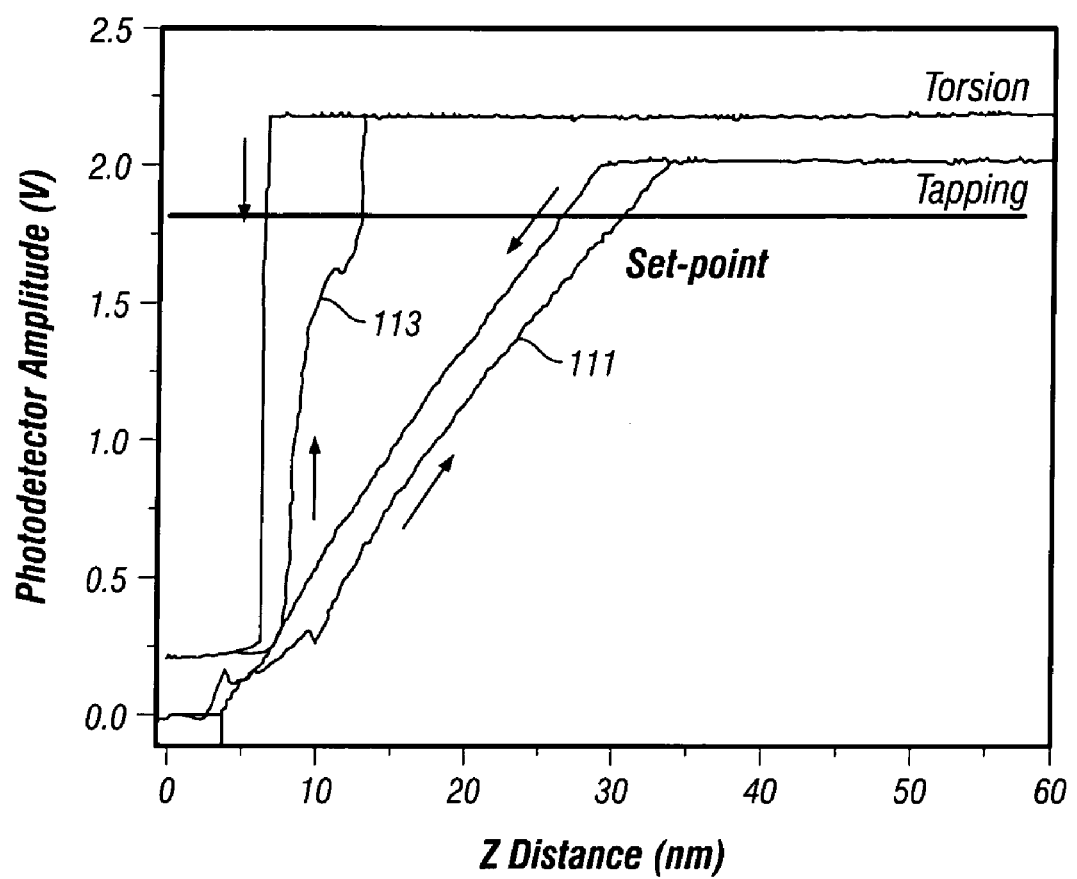
FIG. 6 is a comparison graph illustrating the responses of the torsional mode SPM of the embodiment of FIG. 3, and a prior art flexural mode AFM such as that shown in FIG. 1.

Exemplary advantages offered by the torsional mode AFM 50 over known AFM operating modes, particularly flexural mode AFM, are illustrated by the force curves in FIG. 6. More particularly, in FIG. 6, response curves (111 and 113) for both the prior art flexural mode and the torsional mode described above are plotted as the amplitude change versus the separation between the tip and sample (i.e., the tip/sample distance). The data in FIG. 6 was acquired using a scan of an FESP cantilever on a gold film sample. The flexural mode frequency was about 60 kHz, and the torsion frequency was about 892 kHz.

As shown, an amplitude change of about one volt (IV) in the photodetector signal corresponds to movement of the Z-piezo of the XYZ scanner of about 14 nanometers in flexural mode operation, versus about 0.15 nanometers in torsional mode for the same one volt change. As a result, the error generation speed, which is defined by the slope of the response curves, is much faster in torsion than in tapping mode. In each case, the drop in amplitude is the result of interaction between the tip and the sample. For flexural mode operation, the free air amplitude of probe oscillation is larger than the tip-to-surface distance. This oscillation is constrained by the surfaces and continues to decrease as the sample surface gets closer to the tip. For torsional mode, the amplitude decreases as a result of lateral friction force and force gradient. Again, during operation, the feedback control operates to maintain set-point oscillation by actuating the Z-piezo.

The slope of the amplitude change as a function of the tip-surface distance determines the sensitivity of the amplitude in response to surface topology change. In particular, a sharper slope indicates that a larger amplitude error will be generated for a given amount of tip-surface distance variation, thus leading to a faster system in response in torsional mode, as shown in FIG. 6. In other words, when using torsional resonance control of the preferred embodiment, this large error allows the system to achieve the set-point oscillation faster, thus allowing a faster scan of the sample. Illustrations of the differences between tapping and torsional mode when imaging a given sample are provided in FIGS. 16A & B–19A & B, where cross-sectional plots of data marked in the lines of the image figures are shown.

Figure 16A:
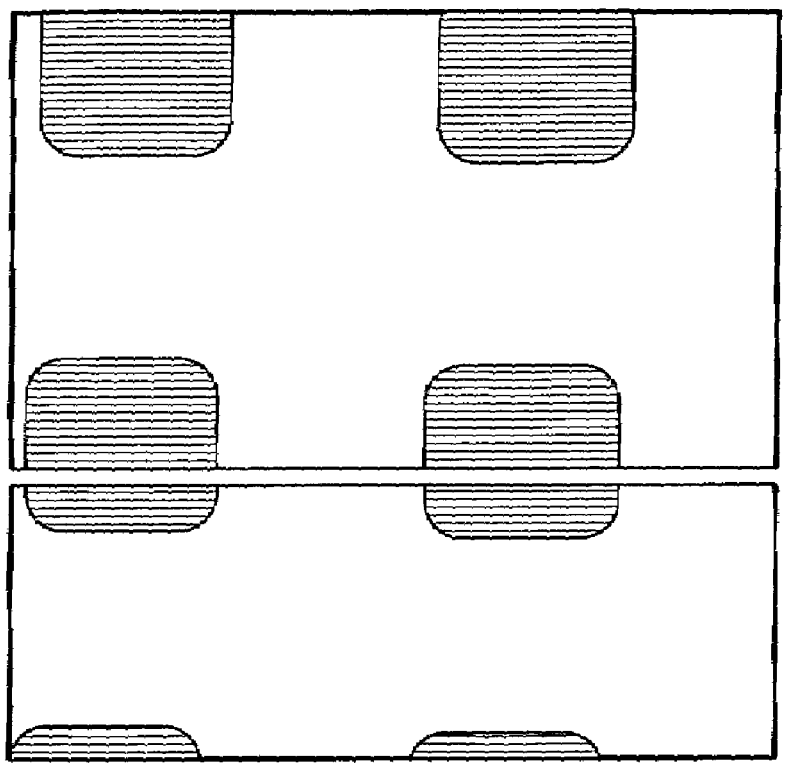
FIGS. 16A & 16B and 17A & 17B are schematic images and corresponding plots, respectively, illustrating SPM data obtained in SPM flexural oscillation mode.
Figure 16B:
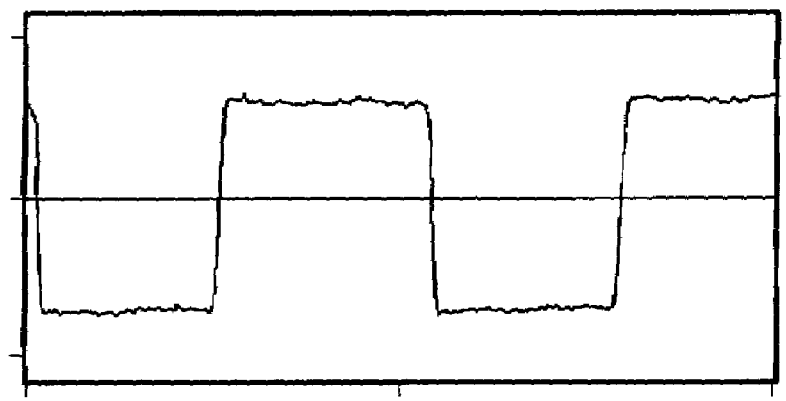
Figure 17A:
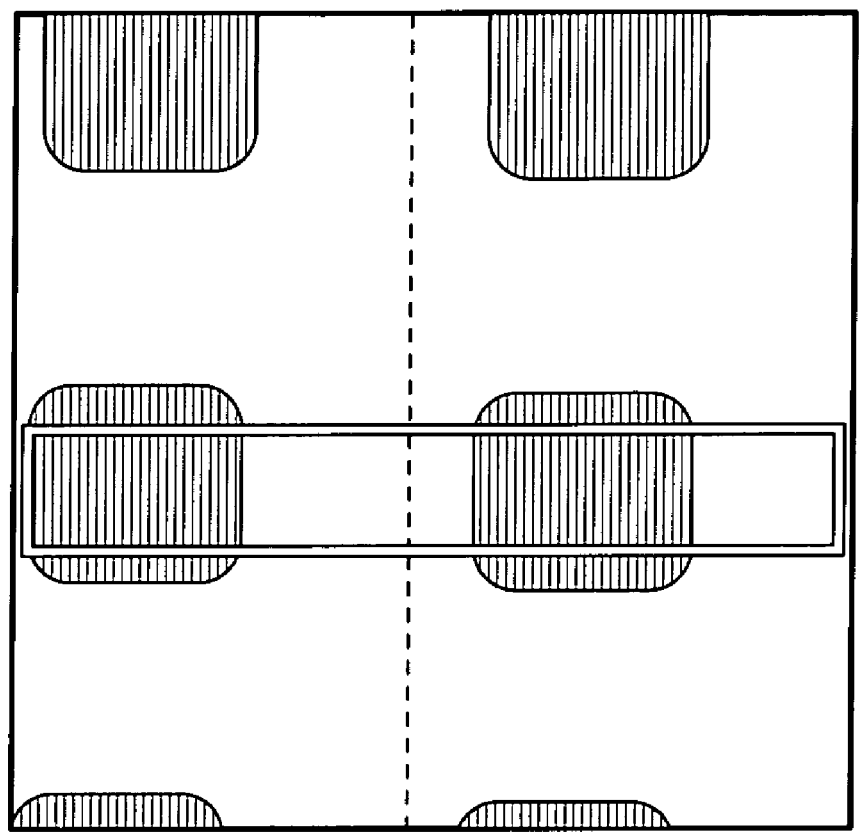
Figure 17B:
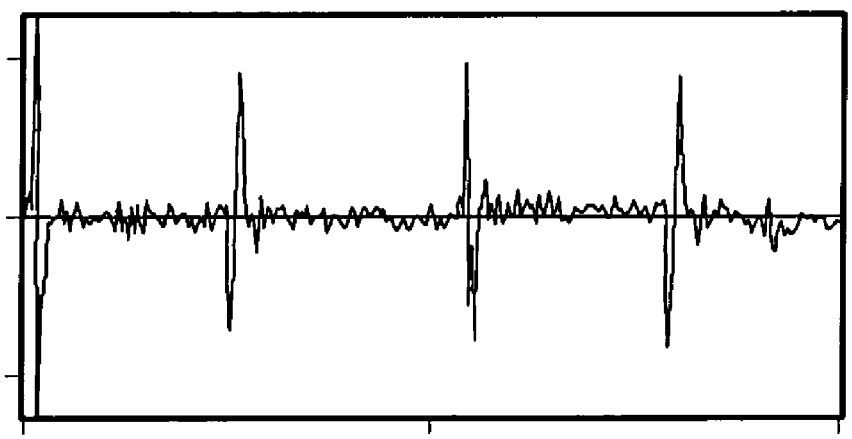
Figure 18A:
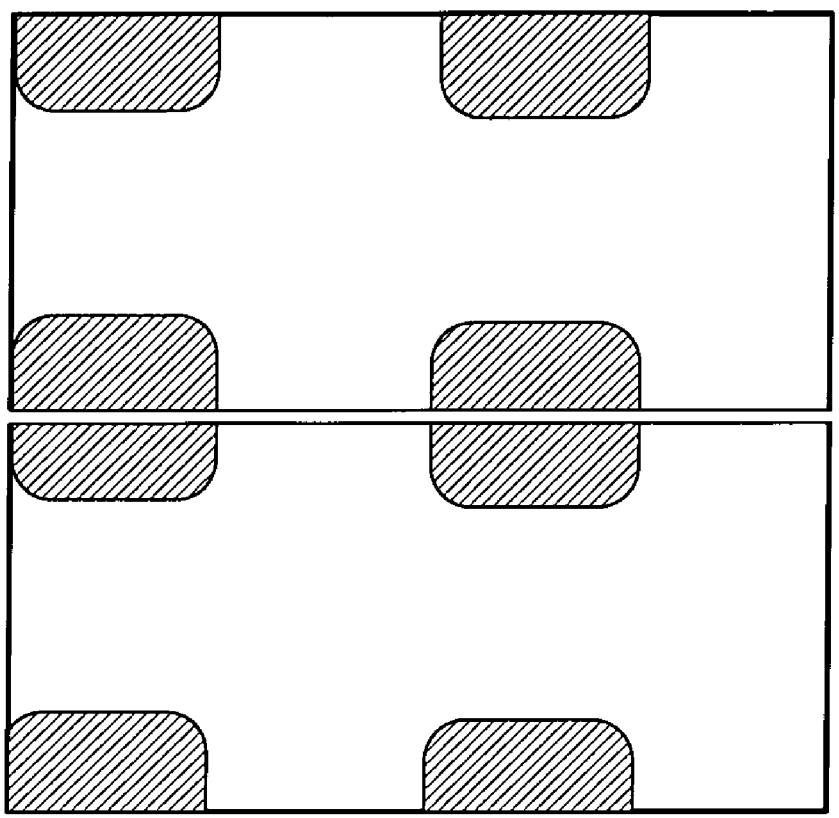
FIGS. 18A & 18B and 19A & 19B are schematic images and corresponding plots, respectively, illustrating data obtained in torsional resonance mode.
Figure 18B:
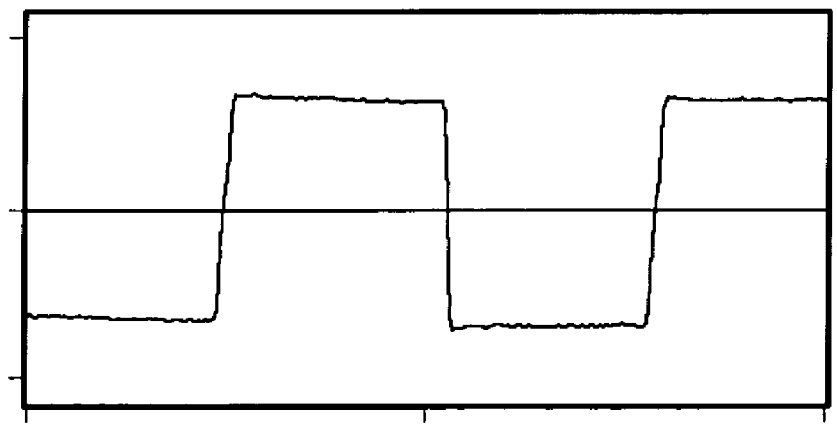
Figure 19A:
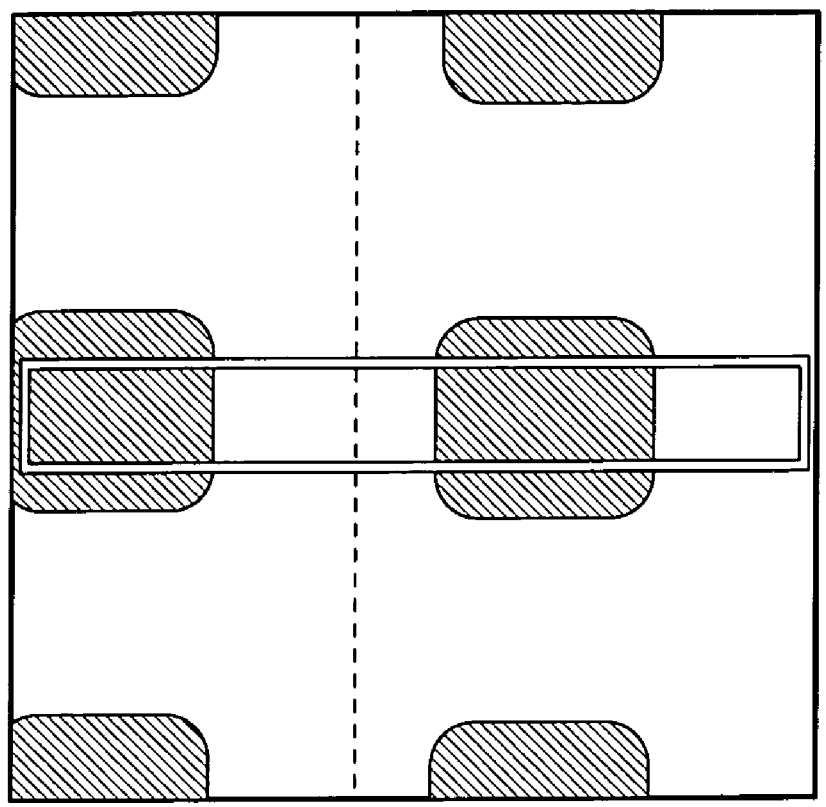
Figure 19B:

In FIGS. 16A and 16B, flexural oscillation mode is used to generate a height image of a sample having a 200 nm step. A 20 µm scan was performed at a 1 Hz scan rate. The corresponding error image and associated plot are shown in FIGS. 17A and 17B. Notably, the background RMS noise in the error image is 8.8 mV. The peak-to-peak error magnitude across the 200 nm step is 53 mV. To the contrary, for the same scan using torsional mode, the height image and plot shown in FIGS. 18A and 18B, and the error image and plot shown in FIGS. 19A and 19B, result. The background RMS noise in the error signal and image is 0.95 mV, and the peak-to-peak error magnitude across the 200 nm step is 7.0 mV. Generally speaking, the RMS of background noise reflects how aggressively the feedback gain can be used. Higher gain reduces errors across sharp steps, but results in less stable feedback. Overall, the sequence of FIGS. 16A & B–19A & B indicates that even at much less aggressive feedback gains, the torsional control gives less error at sharp steps, yielding more reliable data. In other words, at the same scan rate, a more accurate image of a sample can be obtained with the torsional mode AFM of the preferred embodiment.

In contrast to flexural mode operation, the tip/surface interaction in torsional resonance mode is dominated by shear force between the tip and the sample. Notably, this lateral shear force or frictional interaction is anisotropic with respect to the scan direction.

In summary, when compared to flexural mode oscillation, the force curve of the torsional resonance amplitude shows much sharper transition as a function of tip-surface distance, as described previously. Such sharper transition allows faster error generation by the corresponding feedback loop, and much less height data distortion than when using other AFM imaging modes for the same error magnitude. As a result, torsional resonance mode enables high speed scanning. And, an additional advantage provided by the torsional resonance mode is that the phase and amplitude changes detected by the AFM reflect tribology properties of the sample, and do so in at least the nanometer scale.

Figure 20A:
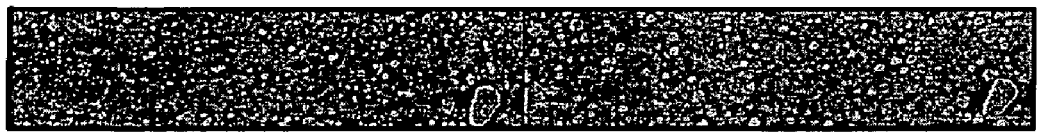
FIGS. 20A, 20B & 20C are images depicting material properties simultaneously acquired by torsional imaging mode and conventional flexural mode.
Figure 20B:
Figure 20C:

Another advantage of torsional resonance-imaging mode is in the area of material property characterization. FIGS. 20A, 20B and 20C show an example of the different types of measurements that can be effectuated during scanning of a magnetic tape surface in this mode. On the left side of each figure, the measurement was performed using conventional flexural mode. The data on the right side was taken by the same tip but scanning in torsional mode in the same area of the sample. The vertical signal obtained in flexural mode imaging was preformed at 87.7 kHz, while torsional mode scanning was performed at 640.7 kHz.

The height data associated with both modes (flexural and torsion) are generally identical, as shown in FIG. 20A, where about 50 nm resolution was obtained in each case. However, the phase images exhibit drastic differences. For example, while the flexural mode phase image (left image) in FIG. 20B shows a strong signature of the height data, the torsional phase contrast appears mostly at the boundaries of the features (right side image of FIG. 20B). This corresponds to higher resolution in torsional mode (about two degrees) versus flexural mode (about 20 degrees). The frequency shift data in the two modes, shown in FIG. 20C, exhibits even more pronounced differences. The left illustration of FIG. 20C shows a flexural resonance-frequency shift. A phase shift is introduced due to a force gradient caused by magnetic interaction between the tip and magnetic domains of the tape. Notably, this shift is measured by lifting the tip 40–100 mm above the surface and keeping tip-surface distance constant during the scan. The differences between this image and the right side, torsional mode image are so pronounced because the two modes measure different tip-sample interaction. The flexural "lift-phase" image reflects a force gradient in the vertical, or z, direction, while the system operating in torsional mode measures a lateral, or y, direction force gradient.

Torsional Resonance Generation

Figure 7:
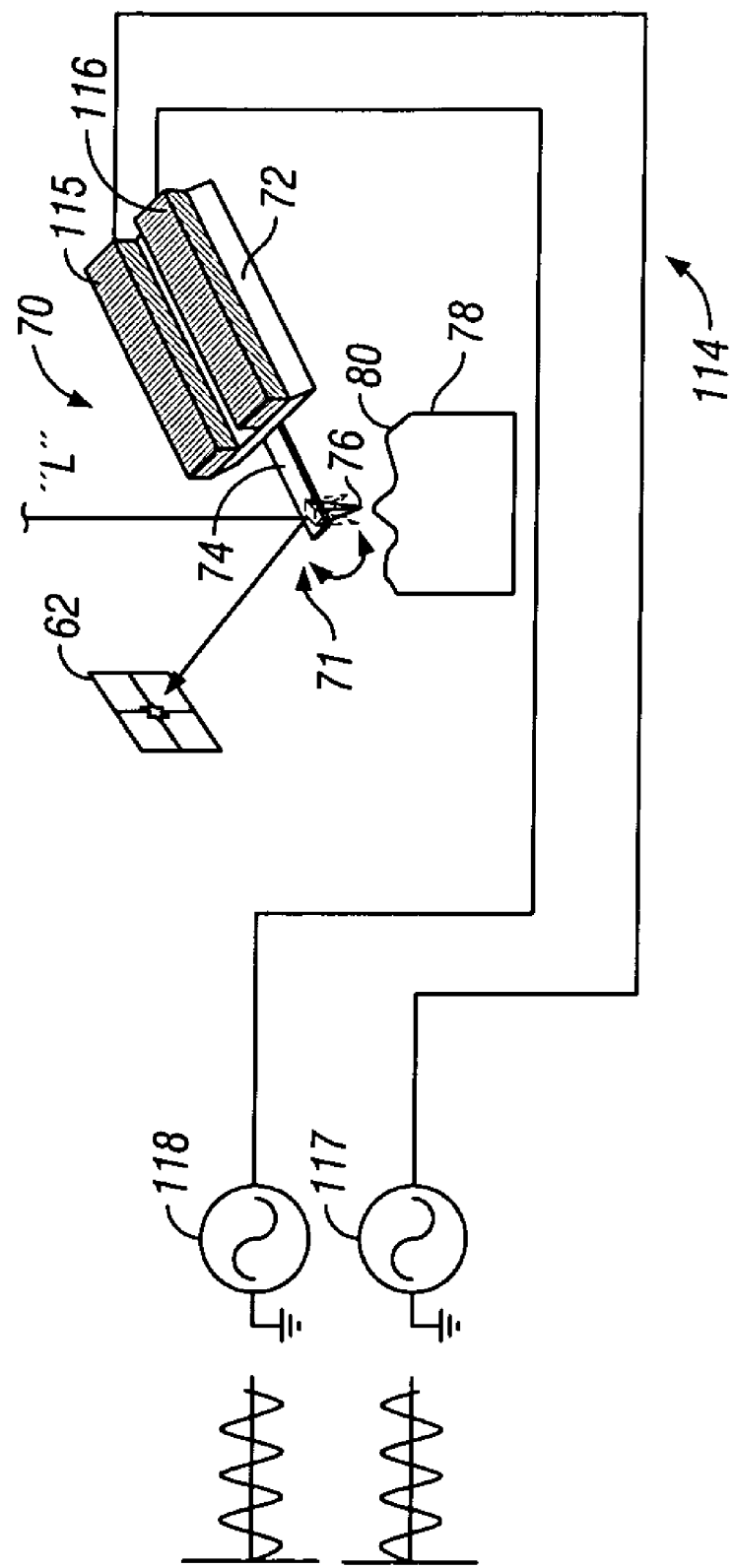
FIG. 7 is a schematic view of a drive for a torsional resonance mode SPM, according to a preferred embodiment.

To generate steady torsional resonance in AFM 50, a number of techniques have been developed. Generally, torsional resonance is generated by exploiting asymmetry within the system, either in the probe itself or a transducer used to drive the AFM. In FIG. 7, an asymmetric transducer 114 is provided to oscillate probe 71 at a torsional resonance. Transducer 114 includes first and second piezoelectric elements 115, 116 that are generally symmetrically disposed on base 72 of probe assembly 70. Elements 115, 116 are generally identical.

To realize its use as an asymmetric drive, transducer 110 includes first and second sources 117, 118 that are employed to provide first and second drive signals to piezoelectric elements 115, 116, respectively. These drive signals are voltage signals that are preferably 180 degrees out of phase with one another. As a result, as one of piezoelectric elements 115, 116 expands, the other contracts. The resulting motion of cantilever 74 in response to such a drive is torsional, and is generated by a torque component that causes a cantilever 74 (which has a large mechanical Q), and hence the probe 71 as a whole, to oscillate steadily. The frequency of the drive signals provided by sources 117, 118 is dependent on a torsional resonance frequency associated with probe 71. A typical fundamental torsional resonance frequency of a probe (e.g., having a 225 µm long cantilever) is about 480 kHz, about 8–10 times higher than the fundamental flexural resonance of the same cantilever.

Figure 8:
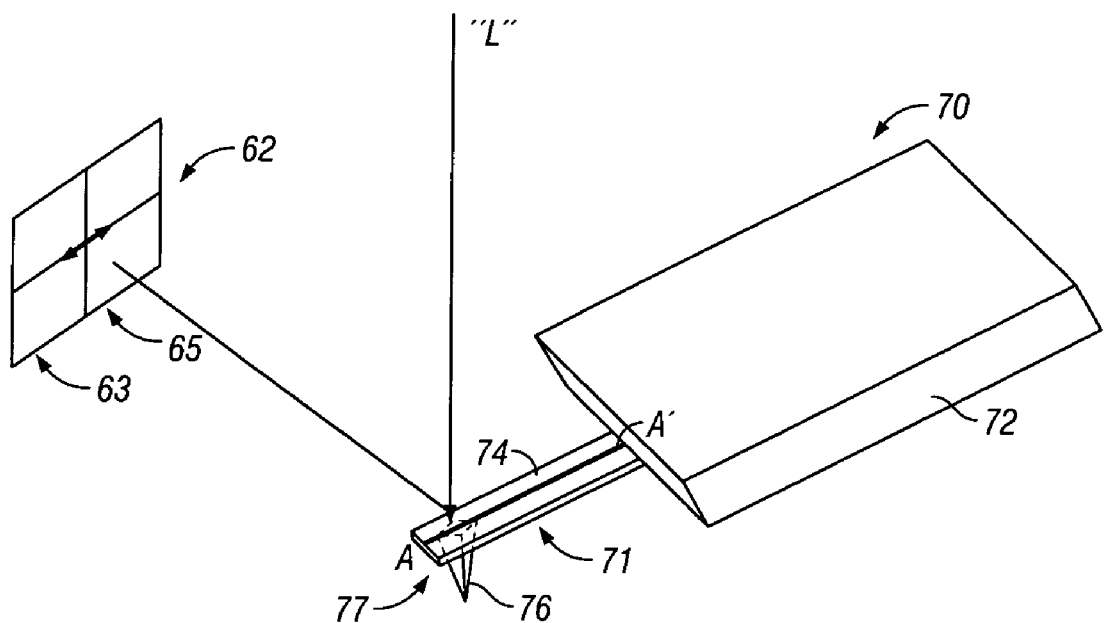
FIG. 8 is a schematic view of a probe assembly according to a preferred embodiment, illustrating torsional movement of the cantilever.

The desired torsional motion of the probe is shown in further detail in FIG. 8. Probe assembly 70 is driven as described above to cause rotation of cantilever 74, and hence probe 71 as a whole, about a longitudinal axis A–A' of cantilever 74. Notably, the angular change near the free end 77 of cantilever 74 is the integral of rotation along the length of the cantilever. This change is measured as the difference between the left and right sections 63, 65, respectively, of quadrature photodetector 62. Because the rotation arm lies in the width direction of the probe 71, the angular change detected by photodetector 62 is significantly greater than when operating in a flexural mode. The result is higher conversion efficiency from cantilever motion to generation of the photodetector signal, and ultimately, control of cantilever oscillation.

In operation, the detected lateral signal (e.g., sensed via quadrature photodetector 62) is conditioned by signal processing circuit 64 (FIGS. 3 and 5). Preferably, signal processing circuit 64 includes a preamplification circuit, a filter, and an RMS-to-DC converter. Again, the signal processing circuit 64 generates a signal that can be compared to a set-point to generate an error, as described previously. The error is then used to correct the Z position through a proportional-integral feedback loop that generates an appropriate control signal. The control signal is applied to the Z section of the piezoelectric actuator (i.e., the XYZ scanner 58 in FIG. 3) to return the probe torsional resonance RMS to the set point.

In another embodiment, illustrated in FIG. 9, driving a probe assembly 120, a probe having a cantilever 126 into torsional resonance includes using an active cantilever such as that shown and described in U.S. Pat. No. 6,189,374, the subject matter of which is hereby incorporated by reference. In this case a piezoelectric layer 122 (for example, a PZT layer) is disposed on, for example, a substrate 124 of probe assembly 120. Notably, piezoelectric layer 122 and the underlying substrate 124 are sufficiently thin to assume any complicated shape so as to allow deformation of cantilever 126 in directions other than flexural deformation. When the drive signal is in the frequency range of torsional resonance of cantilever 126, a steady torsional vibration of cantilever 126 is excited via layer 122 to provide lateral motion of tip 128 in the direction of arrow "T" in FIG. 9. This motion of tip 128 relative to a surface 132 of a sample 130, and changes thereof, is sensed by AFM 50 through the detection of cantilever motion. The AFM 50 then provides system control as described previously to image the surface 132. Notably, the tip/sample separation is controlled using the same actuator (122) as that used to generate the torsional oscillation.

Figure 10:
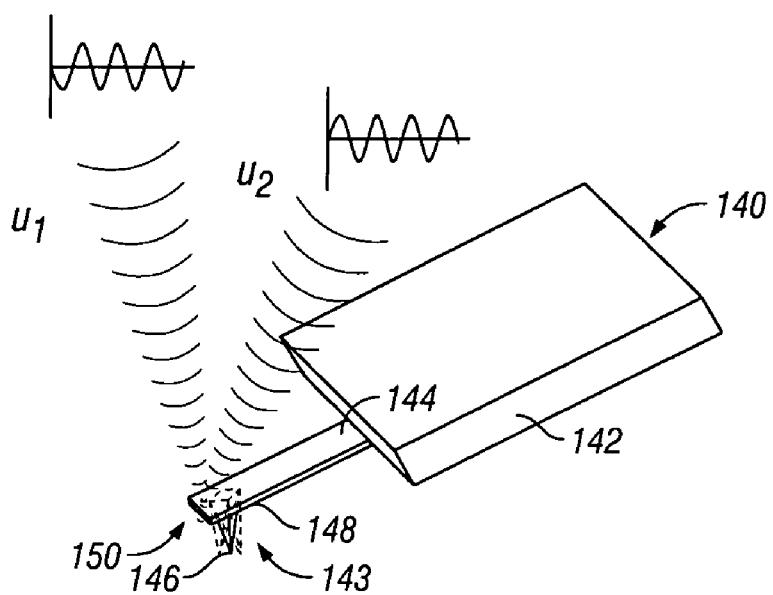
FIG. 10 is a schematic view of a drive for a torsional resonance mode SPM, according to another alternate embodiment.

Turning to FIG. 10, another type of asymmetric drive that may be employed to excite a torsional resonance of a probe is shown. Using ultrasonic actuation, a cantilever is deflected by directing acoustic waves onto the body of the cantilever rather than by moving the base of the cantilever. The cantilever is deflected by a second order force, also known as an acoustic radiation force, generated by one or more beams of ultrasonic energy produced by an ultrasonic actuator such as a zinc oxide transducer. The ultrasonic actuator is supplied with an oscillating RF voltage that may be continuous or varied in a quasistatic manner to apply a constant or changing force to the cantilever. The RF voltage may also be modulated at any frequency from DC to many MHz, thus providing an ideal drive force for oscillating the cantilever over an extremely wide range of frequencies. Driving the body of the cantilever with an ultrasonic actuator produces a much higher localized force than can be achieved through the use of a traditional piezoelectric actuator and, accordingly, permits a "clean" frequency response where the resonance peak is easily identified and differentiated from parasitic resonance peaks.

In this case, focused ultrasonic pressure is used to drive a cantilever 144 of a probe assembly 140 having a substrate 142 to resonate in torsion. Specifically, two sources of ultrasonic pressure (not shown in FIG. 10) generate ultrasonic beams, $U_1$ and $U_2$, amplitude modulated at the torsional resonance frequency having opposite phase in the modulation signal. Beams $U_1$ and $U_2$ are preferably focused so that they are directed toward a back portion 148 of a free end 150 of cantilever 144 of probe 143 so as to cause rotation of cantilever 144, and thus tip 146 supported thereon. Because the beams $U_1$ and $U_2$ are opposite in phase, the corresponding force that impinges on the cantilever 144 causes rotation of cantilever 144, and thus the probe 143 as a whole, along the cantilever's longitudinal axis. For a complete description of using ultrasonic pressure to actuate a cantilever for AFM operation, reference is made to U.S. patent application Ser. No. 10/095,850; filed Mar. 12, 2002, hereby incorporated by reference in its entirety.

Figure 11:
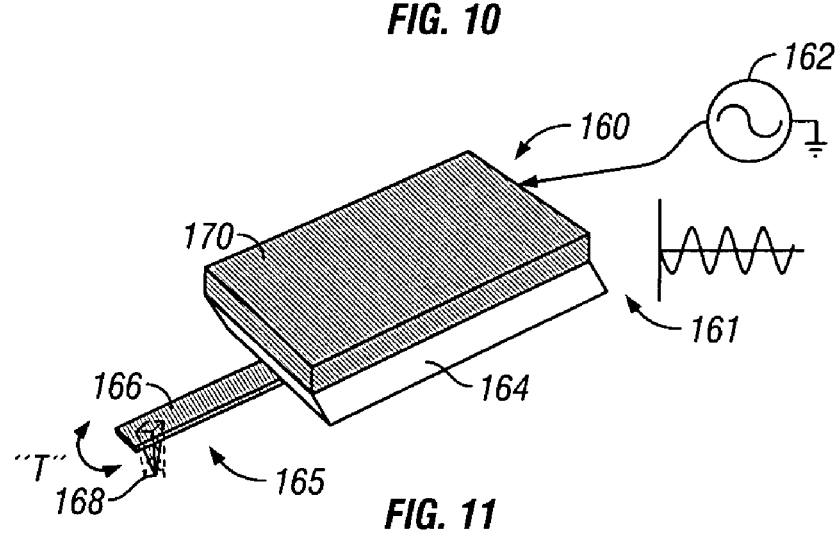
FIG. 11 is a schematic view of a drive for a torsional resonance mode SPM, according to yet another alternative embodiment.

In yet another alternative for effectuating torque resonance in an AFM cantilever, a symmetric drive is employed as shown in FIG. 11. In FIG. 11, a probe assembly 160 includes a probe 165 having a cantilever 166, wherein the probe assembly 160 is driven by a symmetric drive 161. Drive 161 includes a source 162 that generates an AC drive signal which is transmitted to a piezoelectric actuator 170 disposed on a base 164 of probe assembly 160. In this case, the minor asymmetry of probe 165 that is introduced unintentionally during probe assembly processing is sufficient to develop the torsional resonance in cantilever 166. As a result, a tip 168 supported by cantilever 166 is caused to move laterally as shown in FIG. 11 by arrow "T."

Figure 12:
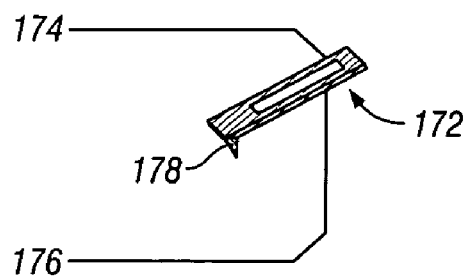
FIG. 12 is a schematic view of a modified probe configured to operate in torsional resonance mode.

In FIG. 12, a probe 171 includes a cantilever 172 that is manufactured to have left and right arms 174, 176, respectively, that are generally parallel to one another. When probe 171 is driven with a typical oscillating drive signal applied to, for example, a piezoelectric drive coupled thereto, the two arms 174, 176 vibrate out of phase in flexural mode. As a result, the probe tip 178 rotates causing lateral motion.

Figure 13:
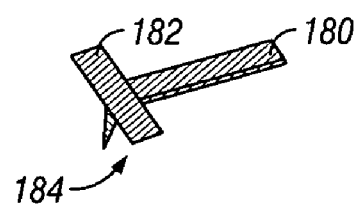
FIG. 13 is a schematic view of another modified probe configured to operate in a torsional resonance mode, according to an alternate embodiment.

Next, because the torsional motion of the tip should be relatively stable to image a sample, an intentionally modified cantilever may be employed, as shown in FIG. 13. In FIG. 13, an orthogonal element 182 (e.g., a paddle mass) may be generally symmetrically disposed at a free end 184 of a cantilever 180. Element 182 operates to stabilize the motion of the cantilever 180 at a torsional resonance frequency associated with the cantilever.

Other types of asymmetric drives for producing torsional motion of an AFM probe include using a conventional split electrode arrangement with an electrostatic drive (not shown), a standard electromagnetic drive employed at radio frequency in which an eddy current is induced to generate the requisite torque (not shown), or a conventional magnetized cantilever placed in a magnetic field to generate a magnetic torque to cause rotation of the cantilever about its longitudinal axis (not shown).

Combined Torsion/Tapping SPM Mode

Next, turning to FIGS. 14A–14D, a technique for implementing torsional resonance mode of the preferred embodiment concurrently with flexural resonance mode (i.e., tapping) to provide, for example, simultaneous torsional mode and flexural mode operation is illustrated. In this case, while the flexural measurement is used to control tip-surface height relationship, and thus generate topology data, the torsional resonance amplitude, which is simultaneously excited by mixing drive signal at torsional resonance frequency into flexural mode drive signal, reflects tip-sample interaction caused by lateral or shear forces. Such an arrangement is useful when imaging, for example, a sidewall of a sample where the tip climbs/descends a vertically sharp wall.

In this embodiment, a modulated flexural oscillation mode drive signal (shown in FIG. 14A) includes a high frequency component to implement the torsional mode. The modulated drive signal is applied to a single plate piezoelectric element 252 disposed on a base 254 of a probe assembly 250 (FIG. 14B). The high frequency component of the drive signal of FIG. 14A is tuned to the torsional resonance frequency of a cantilever 256 of a probe 255, while the low frequency component of the drive signal is set at a flexural resonance frequency of cantilever 256. The response of the cantilever is measured by a quadrature photodetector 260 that is configured to measure vertical or "Z" deflection of cantilever 256, as well as lateral or torsional deflection of cantilever 256 in response to the tip/sample interaction, as illustrated by arrows "V" and "S" respectively, in FIG. 14B. Cantilevers in AFM application generally have high mechanical Q for both flexural mode (Q=100–500) and torsional mode (Q=300–1000). Cantilever itself serves as an extremely effective multi-channel band pass filter, separating the flexural signal into a "V" component and the torsional signal into an "S" component. The output generated by detector is then automatically decomposed (via a filtering step, for example) into a lateral output (FIG. 14C) and a vertical output (FIG. 14D). This is possible because there is no coupling between the two components of the output due to the fact that there is a high mechanical Q associated with each mode of operation. Importantly, therefore, the flexural and shear effects of tip-surface interaction can be measured simultaneously. Notably, either one of the two cantilever response signals (vertical and lateral) can be used to control the main feedback loop, while the other may serve as a passive measurement parameter having no control over tip-sample separation.

Figure 15:
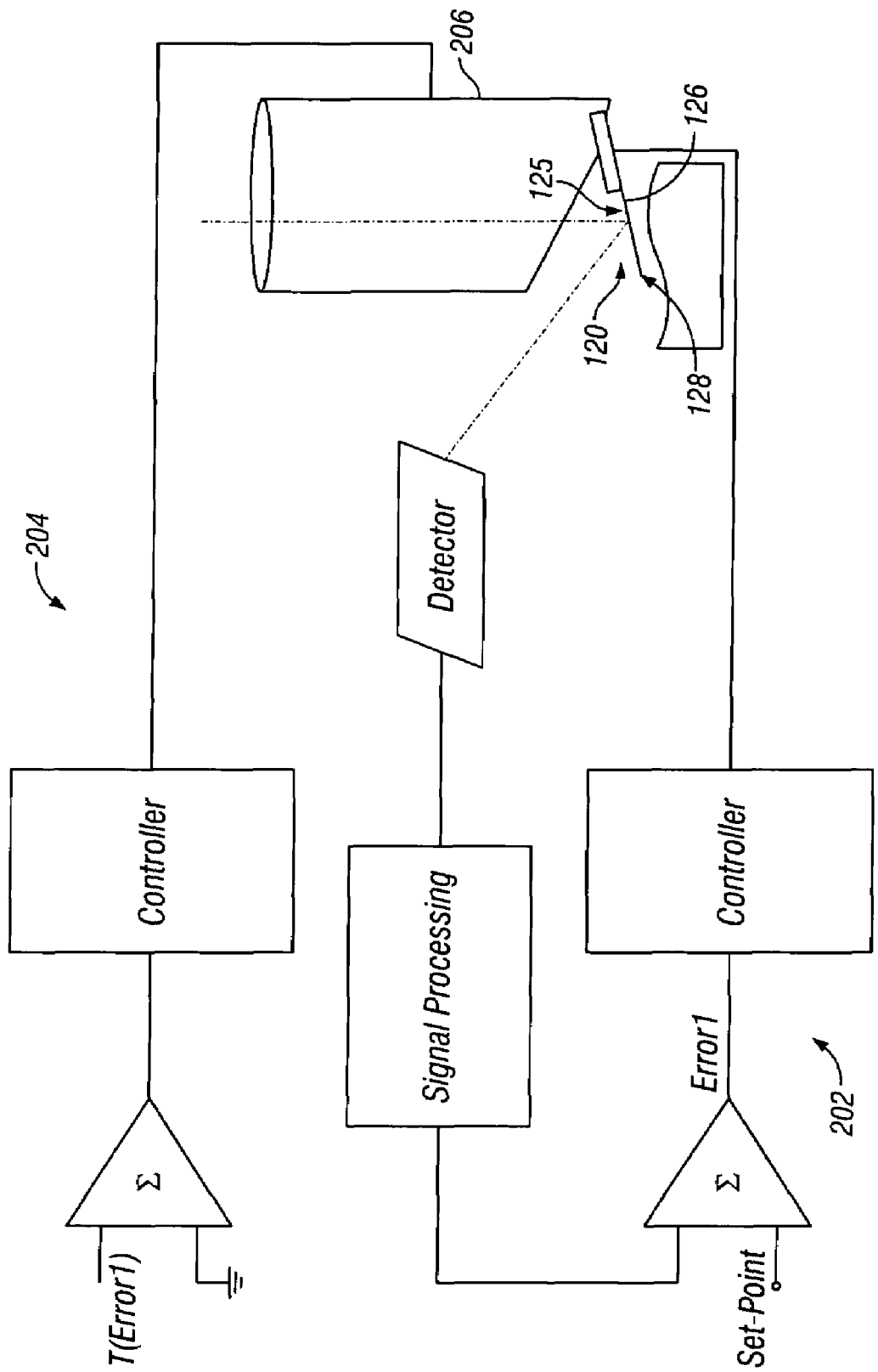
FIG. 15 is a schematic of a torsional resonance mode SPM, according to an alternate embodiment.

Turning next to FIG. 15, an alternate embodiment of a torsional resonance mode AFM 200 using the active cantilever-based probe assembly 120 of FIG. 9 is shown. In this embodiment, torsional oscillating cantilever 126 is controlled by a fast Z actuator 122 (e.g., a layer of lead-zirconium titanate (PZT) or ZnO disposed on substrate 124 of FIG. 9) for enhanced Z response. Again, active cantilever 120 and its operation are shown and described in U.S. Pat. No. 6,189,374, which is expressly incorporated by reference. Notably, the probe assembly 120 is capable of moving tip 128 of the probe 125 of the probe assembly 120 up and down at high bandwidth in response to detected surface features via a first feedback loop 202. First feedback loop 202 is nested within a second feedback loop 204 that includes a Z tube 206 that is actuated to drive probe assembly 120 a larger distance at lower bandwidth when appropriate. In this embodiment, the torsional response is driven by the same piezoelectric actuator 122 disposed on probe assembly 120.

Next, when the probe assembly is used to scan a sample surface, the scanning can be controlled using either of two approaches. Namely, the control can be provided via scanning mode or lift mode. In scanning mode, the phase between the torsional oscillation and the associated drive signal is a direct reflection of the dynamic friction (i.e., the surface viscosity) between the tip and sample surface. The resonance frequency shift due to Van der Waals force, which dominates the flexural mode phase shift, does not play a major role in the phase shift detected in torsion mode. As a result, the mechanism of lag is independent of tapping interaction, and thus new information regarding the sample surface can be obtained. For example, such an advantage is demonstrated by analyzing a graphite sample where water molecules are trapped along atomic ledges of the sample. The phase contrast produced by the torsional resonance image is more than one order of magnitude greater than that of the phase contrast seen in flexural oscillation mode at the same atomic ledge. On the other hand, in lift mode, the resonance frequency shift is induced by a force gradient in the lateral direction. In this case, magnetic or electric domain structure of the sample can be determined, which is not possible in flexural oscillation mode AFM where only vertical component of forces are measured, and thus only a vertical force gradient can be detected.

Although the best mode contemplated by the inventors of carrying out the present invention is disclosed above, practice of the present invention is not limited thereto. For example, the sample may be subjected to alternate environments (e.g., varied media, atmospheric conditions, etc.), and the corresponding torsional mode response analyzed. Notably, such alterations may change oscillation properties of the probe as desired by the user. It will be manifest that various additions, modifications and rearrangements of the features of the present invention may be made without deviating from the spirit and scope of the underlying inventive concept.

What is claimed is:

1. A method of operating a probe-based instrument, the method comprising the steps of:
   providing a probe including a cantilever and a tip, the cantilever having a longitudinal axis;
   torsionally oscillating the probe generally about the axis at a resonance; and
   wherein said torsionally oscillating step is performed using an asymmetric transducer.

2. The method of claim 1, further comprising the steps of:
   changing a separation distance between the tip and a sample so the tip interacts with the sample; and
   detecting a change in the torsional oscillation of the probe in response to the interaction between the tip and the sample.

3. The method of claim 2, further comprising the step of generating a torsional resonance signal in response to said detecting step, and wherein said controlling step controls a relative position of the tip and the sample in response to said torsional resonance signal.

4. The method of claim 3, further comprising the step of using a feedback circuit to generat an error signal in response to a change in the torsional resonance signal, wherein the change in the torsional resonance signal is caused by a change in the interaction.

5. The method of claim 4, further comprising the step of providing relative scanning movement between the tip and the sample, and wherein the error signal is generated in response to said scanning step.

6. The method of claim 4, further comprising the step of altering a measurement environment, wherein the error signal is generated in response to said altering step.

7. The method of claim 2, wherein the change is indicative of a characteristic of the sample.

8. The method of claim 3, wherein the change is indicative of a shear force between the tip and the sample.

9. The method of claim 2, wherein said detecting step is performed using a deflection detection system.

10. The method of claim 9, wherein the deflection detection system includes a quadrature photodetector.

11. The method of claim 9, wherein the deflection detection system is one of a group including an optical system, an electromagnetic system, and a piezo electric position detection system.

12. The method of claim 1, further comprising measuring a phase difference between a drive signal used to torsionally oscillate the probe and an oscillation of the probe in response to an interaction between the tip and a sample.

13. The method of claim 1, further comprising scanning a sample with the tip.

14. The method of claim 13, further comprising the step of measuring a shear force between the sample and the tip.

15. The method of claim 14, wherein the shear force is indicative of local friction.

16. The method of claim 2, wherein said detecting step includes sensing a force gradient field.

17. The method of claim 16, wherein the change is a frequency shift of the torsional resonance.

18. The method of claim 1, further comprising flexurally oscillating the probe at a flexural resonance of the probe.

19. The method of claim 18, wherein said torsionally oscillating and said flexurally oscillating steps are performed simultaneously.

20. The method of claim 19, further comprising applying a multiple frequency drive signal to an actuator coupled to the probe.

21. The method of claim 19, further comprising detecting torsional and flexural oscillation of the probe.

22. The method of claim 21, further comprising:
generating a signal in response to said detecting step; and
decomposing the signal into a vertical signal and a lateral signal.

23. The method of claim 18, wherein said torsionally oscillating and flexurally oscillating steps are performed sequentially with respect to a scan line on a sample being measured.

24. The method of claim 1, wherein the asymmetric transducer is integral with the probe.

25. The method of claim 1, wherein the drive signals define first and second drive signals that are about 180 degrees out of phase.

26. The method of claim 1, wherein said torsionally oscillating step includes applying an oscillating drive signal to an actuator coupled to the probe and wherein the probe includes first and second arms that oscillate out of phase with respect to one another in response to said oscillating drive signal.

27. The method of claim 2, further comprising controlling the separation distance using feedback.

28. The method of claim 27, wherein the feedback monitors the phase of a torsional oscillation of the probe.

29. A method of measuring a property of a sample, the method comprising the steps of:
driving a probe having a tip at a torsional resonance of the probe;
changing a separation between the tip and the sample so as to cause interaction between the tip and the sample;
detecting the interaction, wherein the interaction is indicative of one of a group including a shear force and a force gradient; and
wherein said driving step is perfomed using an asymmetric transducer, and wherein the asymmetric transducer includes at least two sources of ultrasonic energy generally mounted on opposite sides of the tip and are driven by respective signals having at least one different property.

30. The method of claim 29, further comprising generating an output signal in response to said detecting step, the output signal being indicative of a characteristic of the sample.

31. The method of claim 30, further comprising comparing the output signal to a set-point.

32. The method of claim 31, further comprising generating a control signal in response to said comparing step, wherein the control signal controls an XYZ actuator to reposition the tip so as to keep an oscillation signal amplitude of the probe generally equal to the set-point.

33. The method of claim 29, wherein the two sources of ultrasonic energy are piezoelectric elements driven by first and second drive signals substantially 180° out of phase.

34. The method of claim 29, further comprising the step of oscillating the probe at a flexural resonance of the cantilever.

35. The method of claim 34, wherein the flexural resonance is in a range of about 1 kHz to 1000 kHz, and the torsional resonance is in a range of about 10 kHz to 2000 kHz.

36. A probe-based instrument comprising:
a probe assembly including a base and a probe, said probe having a cantilever extending from said base and a tip supported by said cantilever;
a drive coupled to said probe assembly and configured to actuate said probe into torsional oscillation; and
wherein said drive is asymmetric, and wherein said asymmetric drive includes at least two sources of ultrasonic energy generally mounted on opposite sides of the tip and are driven by different signals.

37. The instrument of claim 36, wherein said drive includes at least two sources of ultrasonic energy that direct corresponding ultrasonic pressure beams toward said cantilever.

38. The instrument of claim 37, wherein the at least two ultrasonic pressure beams are opposite in phase.

39. The instrument of claim 36, wherein said drive includes a source of ultrasonic energy that focuses an ultrasonic pressure beam at an asymmetric position of the cantilever.

40. The instrument of claim 36, wherein said drive is an electromagnetic drive that generates an eddy current to produce a torque about a longitudinal axis of said cantilever.

41. The instrument of claim 40, wherein an output of said electromagnetic drive is in an RF band.

42. The instrument of claim 36, wherein said drive is an electrostatic drive.

43. The instrument of claim 36, wherein said cantilever of said probe assembly is magnetized, and wherein said drive includes a magnetic field source that generates a magnetic torque in said probe to cause rotation of said tip about a longitudinal axis of said cantilever.

44. The instrument of claim 37, wherein said drive generates a modulated signal that actuates said probe into flexural oscillation.

45. The instrument of claim 44, further comprising a detector configured to sense a change in at least one of (1) a torsional oscillation of said probe, and (2) a flexural oscillation of said probe.

46. The instrument of claim 45, wherein said detector is a quadrature photodetector, said photodetector sensing both flexural oscillation and torsional oscillation simultaneously.

47. The instrument of claim 36, further comprising a scanner configured to provide relative scanning motion between said tip and a sample.

48. The instrument of claim 47, further comprising a detector configured to sense a shear force between said tip and the sample.

49. The instrument of claim 36, wherein said probe is modified to increase the stability of the torsional oscillation of said probe.

50. The instrument of claim 49, wherein said modified probe includes a paddle mass.

51. The instrument of claim 37, wherein said cantilever includes generally parallel longitudinal arms.

52. The instrument of claim 36, wherein said probe includes an integral actuator that is deformable.

53. The instrument of claim 37, wherein said probe includes first and second arms that oscillate out of phase with respect to an output of said drive.

54. The instrument of claim 37, further comprising a feedback loop to control a separation distance between said tip and a sample.

55. The instrument of claim 54, wherein said feedback loop monitors the phase of the torsional oscillation of said tip.

56. A drive for a probe-based instrument, the drive comprising:
an actuator coupled to a probe assembly of the instrument, said probe assembly including a probe having a tip, and said actuator driving said probe at a torsional resonance thereof; and
wherein said actuator includes a plurality of piezoelectric elements that are generally mounted on opposite sides of the tip and are driven by different signals.

57. A probe-based instrument comprising:
a probe assembly including a probe having a cantilever and a tip supported by said cantilever;
an actuator coupled to said probe assembly;
a signal generator that transmits a modulated signal to said actuator to drive said probe into both flexural oscillation and torsional oscillation; and
wherein said acutator includes a pair of piezoelectric elements mounted substantially on opposite sides of the tip, the piezoelectric elements driven by oscillating drive signals substantially 180° out of phase.

58. The apparatus of claim 57, wherein said actuator is disposed on said probe.

59. The apparatus of claim 57, further comprising:
a detector that generates both a torsional signal and a flexural signal in response to interaction between said tip and a surface of a sample; and
a feedback circuit that (1) uses one of the torsional signal and the flexural signal to control a distance between the tip and the surface, and (2) uses the other of the torsional signal and the flexural signal as a passive measurement of at least one property of the surface.

60. The drive of claim 56, wherein said piezoelectric elements include first and second piezoelectric elements responsive to respective drive signals substantially 180° out of phase.

61. The drive of claim 56, wherein the probe is asymmetric about a longitudinal axis of the cantilever of the probe.

62. The method of claim 1, further comprising a controlling step to maintain a generally constant separation between the tip of the probe and a sample.

63. An apparatus to control and maintain generally constant probe/sample interaction using torsional resonance, comprising:
a probe;
a plurality of piezoelectric elements coupled to the probe and driven by independent drive signals having at least one different property so as to excite a torsional resonance of the probe;
a displacement detection system to generally simultaneously sense flexural and torsional movement of said probe;
an xyz actuator to provide relative motion between said probe and a sample in three generally orthogonal directions; and
a feedback system coupled to said detection system and said actuator to maintain constant probe sample interaction in response to detecting a change in said torsional resonance of said probe.

64. The apparatus of claim 63, further including:
a scanning system coupled to said xyz actuator to reposition said probe at a different position of said sample.

65. The apparatus of claim 64, further including:
a data acquisition system coupled to said xyz actuator to create a 3D image.

* * * * *

UNITED STATES PATENT AND TRADEMARK OFFICE
CERTIFICATE OF CORRECTION

PATENT NO.    : 6,945,099 B1
DATED         : September 20, 2005
INVENTOR(S)   : Chanmin Su et al.

It is certified that error appears in the above-identified patent and that said Letters Patent is hereby corrected as shown below:

Column 16,
Line 44, delete "controlling" and substitute -- changing --.
Line 48, delete "generat" and substitute -- generate --.

Column 17,
Line 3, delete "piezo electric" and substitute -- piezoelectric --.

Signed and Sealed this

Sixth Day of June, 2006

JON W. DUDAS
*Director of the United States Patent and Trademark Office*